(12) United States Patent
Ehrenreich et al.

(10) Patent No.: US 7,914,030 B2
(45) Date of Patent: Mar. 29, 2011

(54) CONVERTIBLE STROLLER-CYCLE

(75) Inventors: Michael Ehrenreich, South Orange, NJ (US); Joel Hoag, Brooklyn, NY (US); Brian Rhee, New York, NY (US)

(73) Assignee: Soma Cycle, Inc., South Orange, NJ (US)

( * ) Notice: Subject to any disclaimer, the term of this patent is extended or adjusted under 35 U.S.C. 154(b) by 0 days.

(21) Appl. No.: 12/834,261

(22) Filed: Jul. 12, 2010

(65) Prior Publication Data

US 2010/0294073 A1 Nov. 25, 2010

Related U.S. Application Data

(62) Division of application No. 11/898,791, filed on Sep. 14, 2007, now Pat. No. 7,780,184.

(51) Int. Cl.
| | |
|---|---|
| *B62K 21/00* | (2006.01) |
| *B62K 27/12* | (2006.01) |
| *B62K 13/00* | (2006.01) |
| *B62D 12/00* | (2006.01) |
| *B62B 7/12* | (2006.01) |

(52) U.S. Cl. ........ 280/264; 280/643; 280/648; 280/204; 280/240; 280/292; 280/407; 280/410; 280/415.1; 280/419; 280/428; 280/481; 280/282; 280/32.7

(58) Field of Classification Search .................. 280/643, 280/648, 47.18, 204, 202, 240, 263, 264, 280/288.4, 292, 400, 407, 410, 415.1, 419, 280/424, 428, 481, 282, 32.7
See application file for complete search history.

(56) References Cited

U.S. PATENT DOCUMENTS

| | | | |
|---|---|---|---|
| 1,059,466 A | 4/1913 | Hosmer |
| 1,218,943 A | 3/1917 | Hudry |
| 1,347,384 A | 7/1920 | Kinnard |
| 1,408,729 A | 3/1922 | Green |
| 1,560,288 A | 11/1925 | Murvay |

(Continued)

FOREIGN PATENT DOCUMENTS

EP 1690782 A1 8/2006

(Continued)

OTHER PUBLICATIONS

International Search Report for related PCT Application No. PCT/US07/20216, dated May 9, 2008.

(Continued)

*Primary Examiner* — J. Allen Shriver, II
*Assistant Examiner* — John R Olszewski
(74) *Attorney, Agent, or Firm* — Caesar, Rivise, Bernstein, Cohen & Pokotilow, Ltd.

(57) ABSTRACT

A braking and steering assembly in a vehicle having a pushing section and a riding section. The assembly includes an upper connection post containing braking and steering components for the riding section. The upper connection post has an upper end and a lower threaded end. The assembly further includes a lower connection post containing braking and steering components for the pushing section. The lower connection post has an aperture for threadedly receiving the lower threaded end of the upper connection post. The assembly also includes a rotatable front knob fixed to the upper end of the upper connection post. Rotatably tightening the front knob connects the lower end of the upper connection post with the upper end of the lower connection post. Braking and steering in the riding section controls braking and steering in the pushing section.

5 Claims, 43 Drawing Sheets

U.S. PATENT DOCUMENTS

| | | | |
|---|---|---|---|
| 1,661,257 A * | 3/1928 | Kirch | 280/202 |
| 2,305,719 A | 12/1942 | Lee | |
| 2,435,733 A | 2/1948 | Belyeu | |
| D149,194 S * | 4/1948 | Larralde | D12/112 |
| 2,468,933 A | 5/1949 | Jones | |
| 2,798,727 A | 7/1957 | Viggo et al. | |
| 3,314,494 A | 4/1967 | Weitzner | |
| 3,738,700 A | 6/1973 | Terry | |
| 3,954,283 A | 5/1976 | Boehm et al. | |
| 4,015,297 A | 4/1977 | Christian | |
| 4,566,150 A | 1/1986 | Boothe | |
| 4,770,431 A * | 9/1988 | Kulik | 280/202 |
| 4,773,510 A | 9/1988 | Sato | |
| 4,811,620 A | 3/1989 | Old | |
| 4,825,484 A | 5/1989 | Riegel | |
| 4,958,842 A | 9/1990 | Chang | |
| 5,094,322 A | 3/1992 | Casillas | |
| 5,125,674 A | 6/1992 | Manuszak | |
| 5,168,601 A | 12/1992 | Liu | |
| 5,190,306 A | 3/1993 | Nauman et al. | |
| 5,431,255 A | 7/1995 | Tsuchie | |
| 5,558,357 A | 9/1996 | Wang | |
| 5,562,300 A | 10/1996 | Nelson | |
| 5,590,896 A | 1/1997 | Eichhorn | |
| 5,692,760 A | 12/1997 | Pickering | |
| 5,709,400 A | 1/1998 | Bonnier et al. | |
| 5,732,601 A | 3/1998 | Wu | |
| 5,785,335 A * | 7/1998 | George | 280/204 |
| 5,820,146 A | 10/1998 | Van Ligten | |
| 5,829,314 A | 11/1998 | Scura | |
| 5,884,922 A | 3/1999 | Pickering | |
| 5,975,551 A | 11/1999 | Montague et al. | |
| 6,164,666 A | 12/2000 | Prea | |
| 6,231,056 B1 | 5/2001 | Wu | |
| 6,237,995 B1 | 5/2001 | Dierickx | |
| 6,339,862 B1 | 1/2002 | Cheng | |
| 6,340,168 B1 | 1/2002 | Woleen | |
| 6,343,406 B1 | 2/2002 | Yeh | |
| 6,511,248 B2 | 1/2003 | Wu | |
| 6,921,102 B2 | 7/2005 | Hsia | |
| 7,080,848 B2 * | 7/2006 | Hara et al. | 280/279 |
| 7,249,779 B2 | 7/2007 | Ehrenreich et al. | |
| 2001/0035626 A1 | 11/2001 | Kettler | |
| 2003/0151225 A1 | 8/2003 | Lopez | |

FOREIGN PATENT DOCUMENTS

| | | |
|---|---|---|
| JP | 2000060902 A2 | 2/2002 |
| JP | 03099829 U9 | 12/2003 |
| JP | 2007331515 A | 12/2007 |
| WO | WO03084807 A1 | 10/2003 |
| WO | WO2006112688 A1 | 10/2006 |

OTHER PUBLICATIONS

International Search Report for PCT Application No. PCT/US2009/051352, dated Jul. 22, 2009.

* cited by examiner

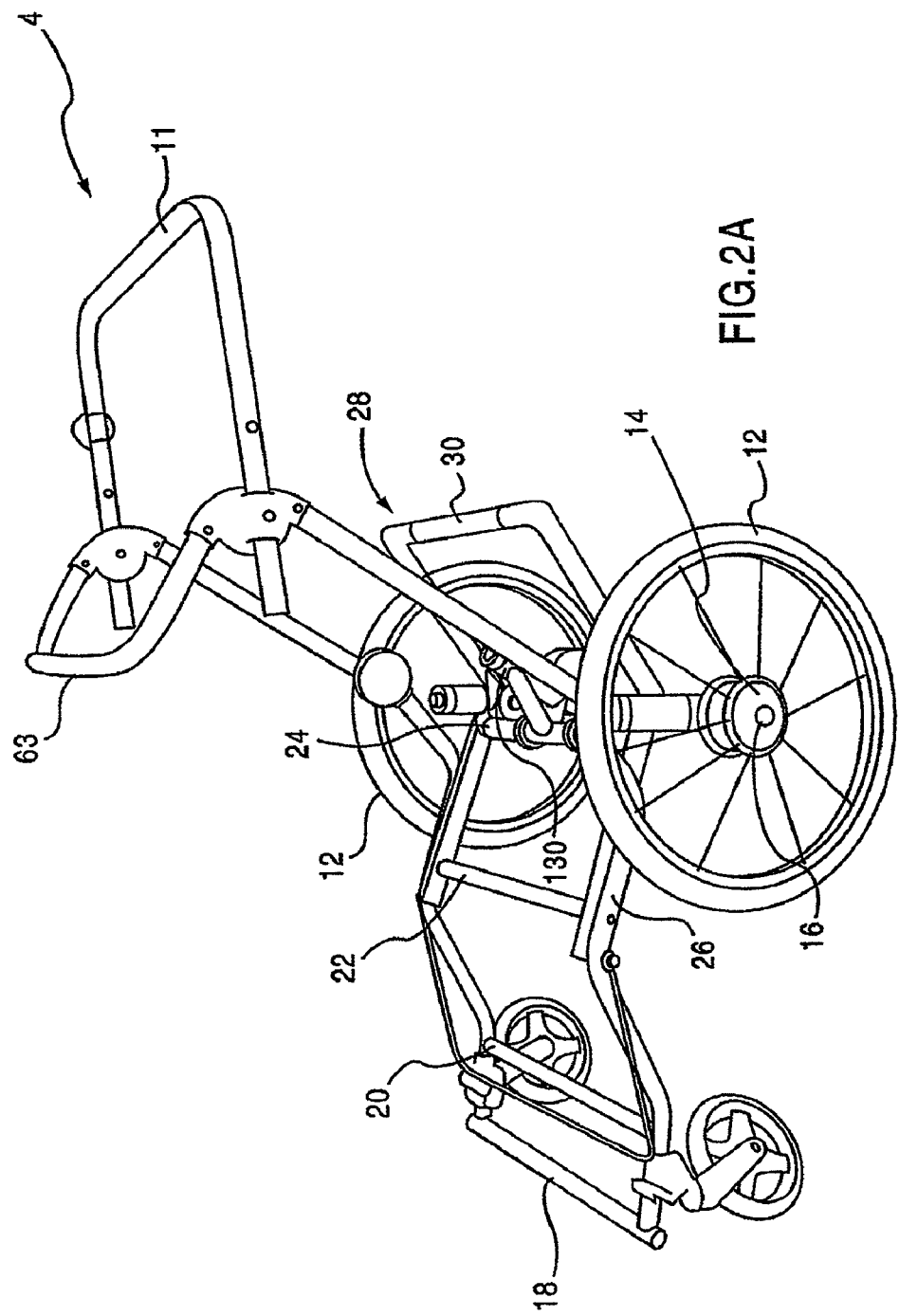

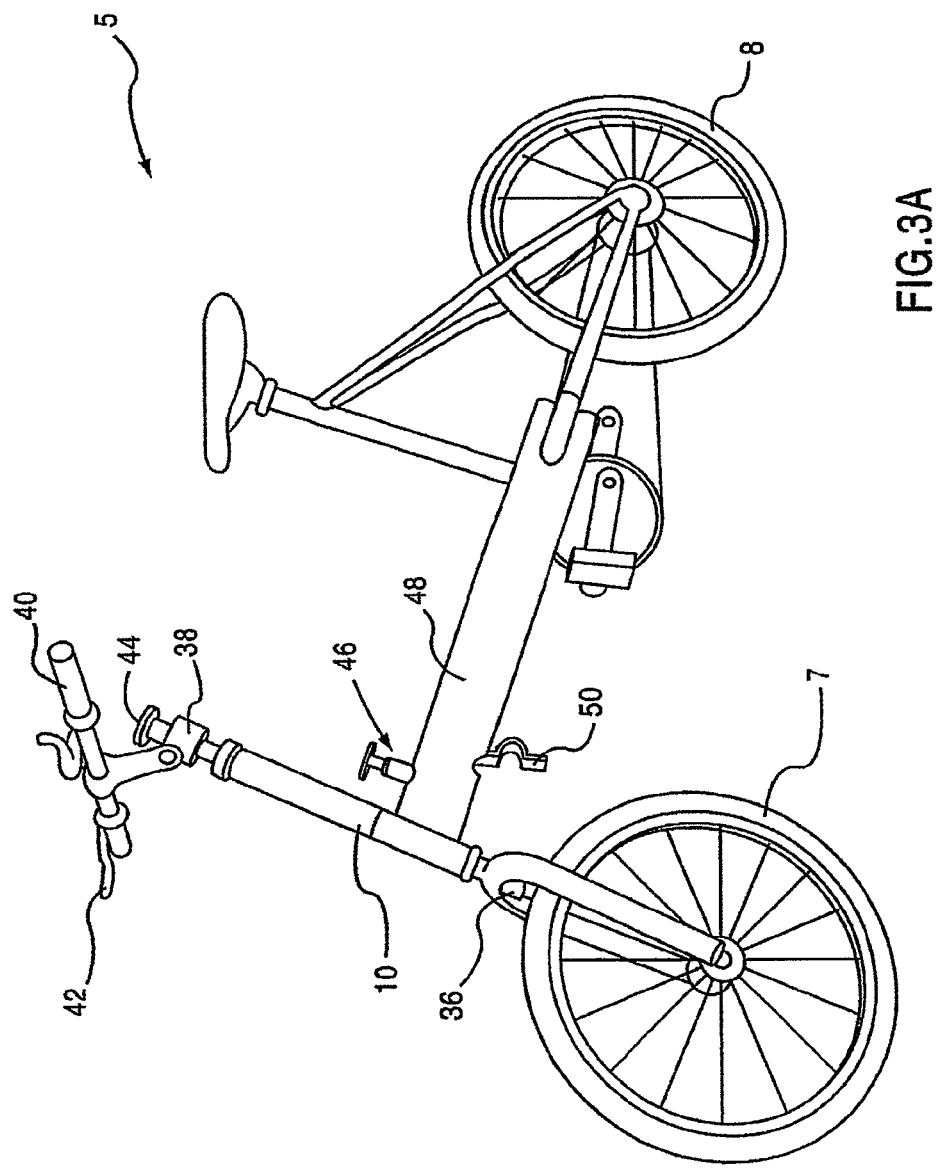

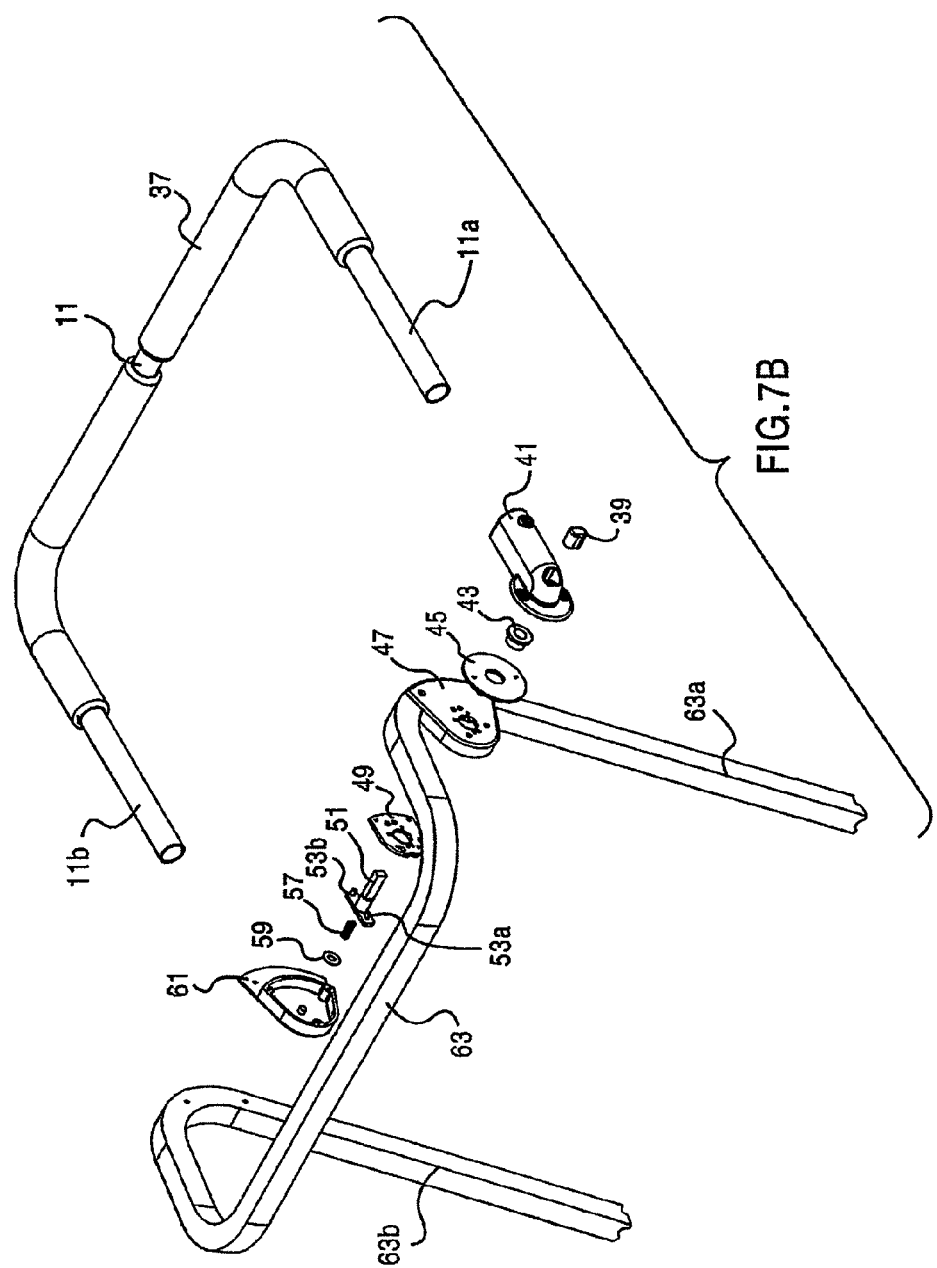

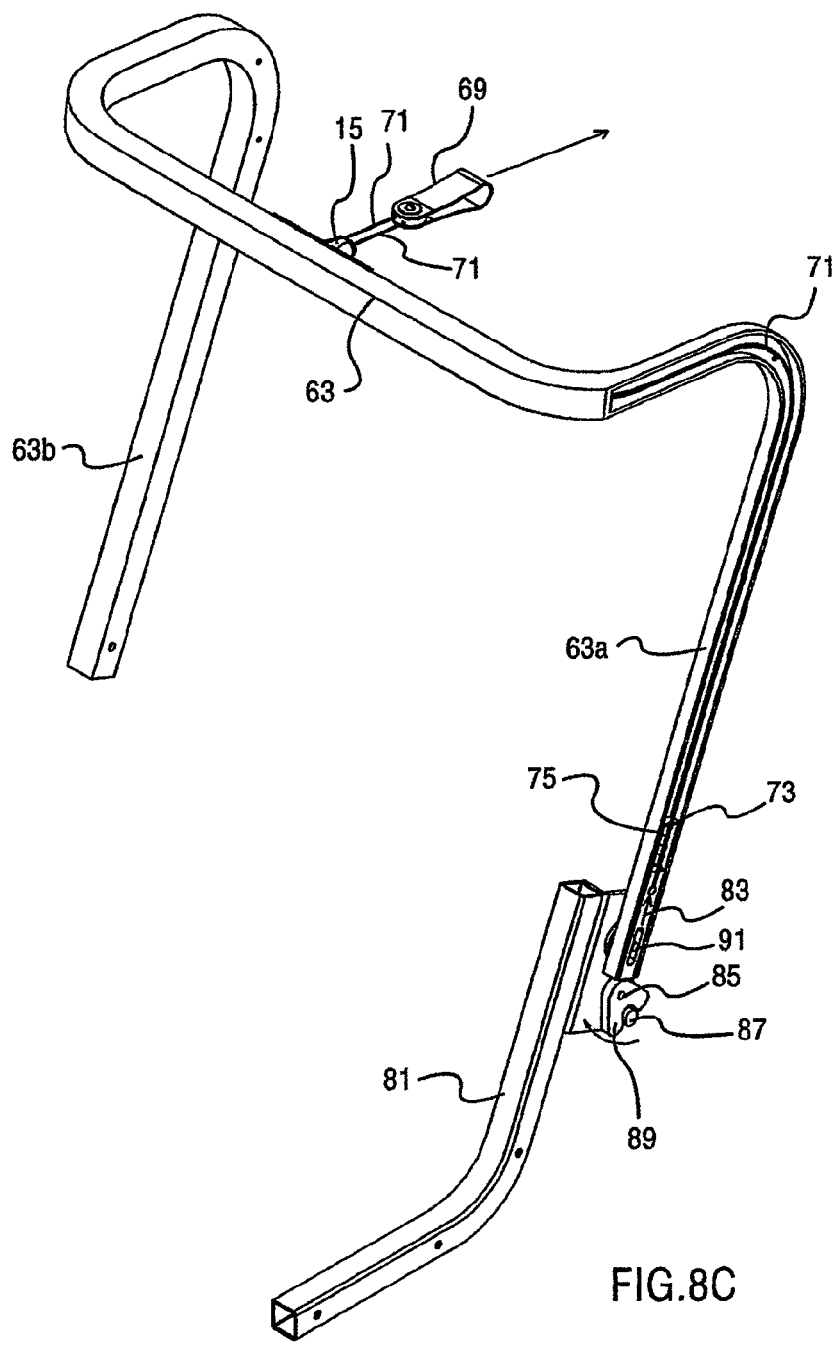

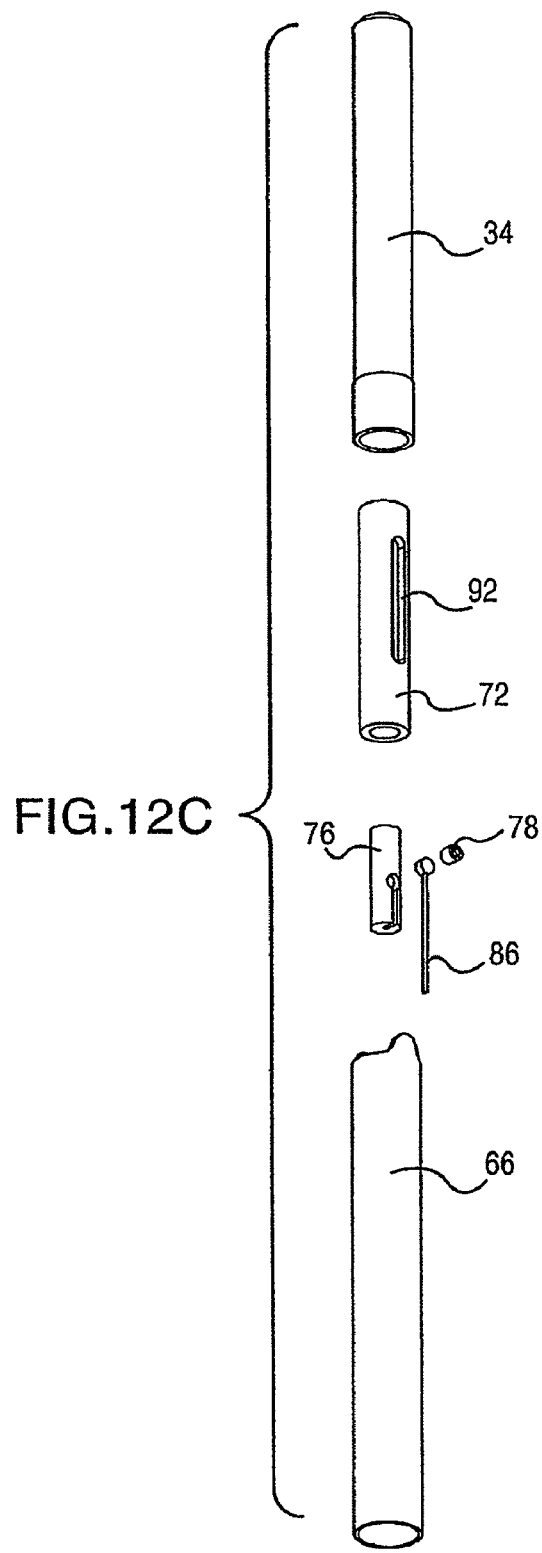

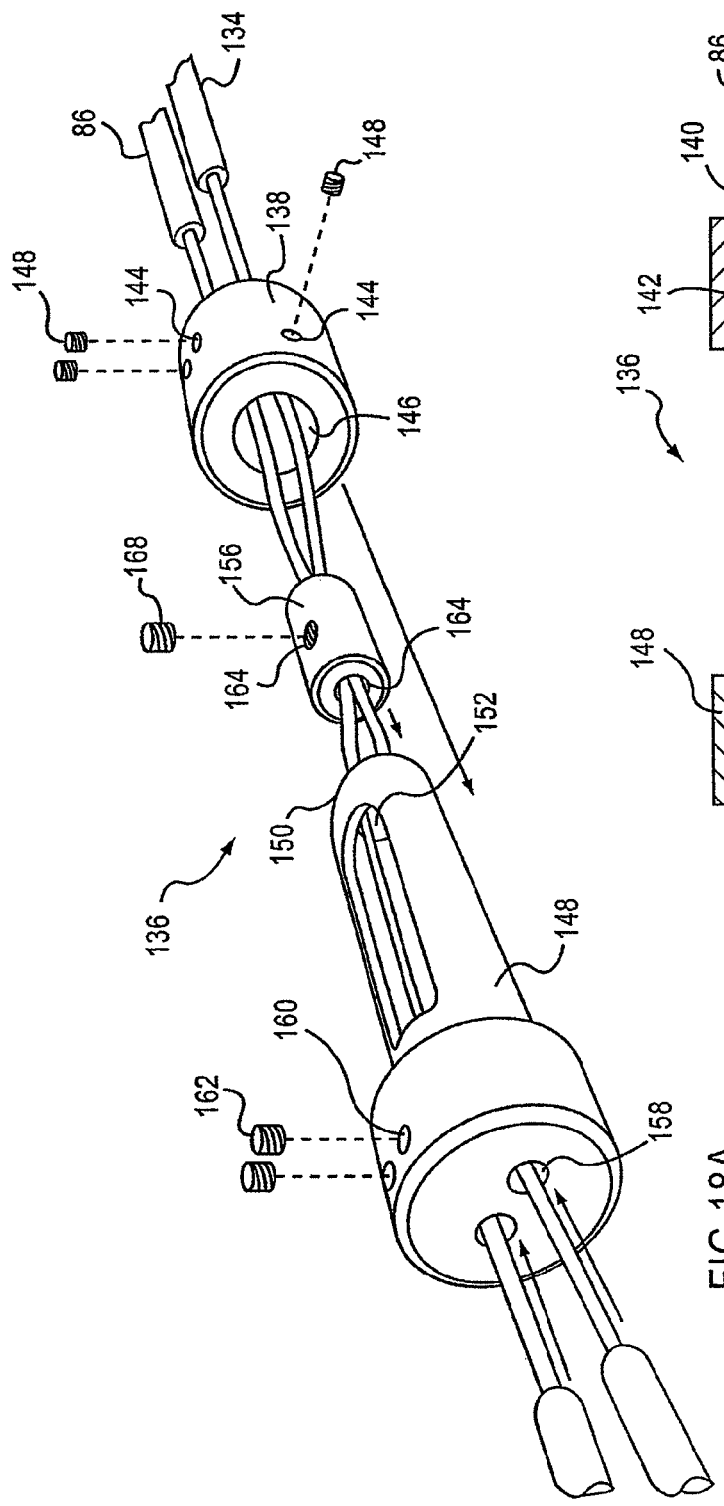
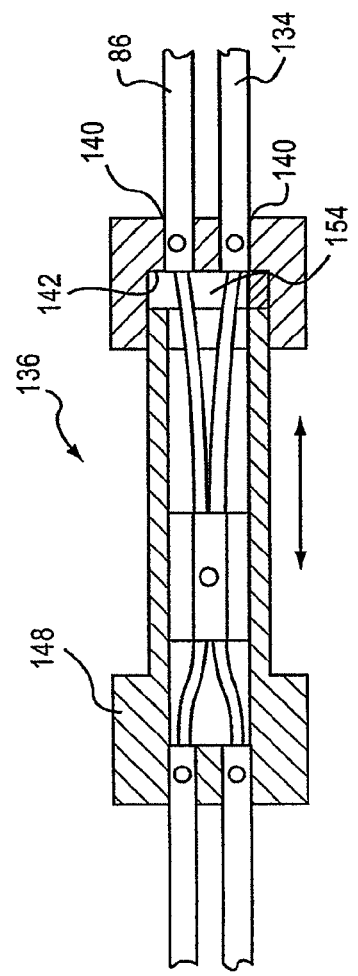
FIG. 18A
FIG. 18B

CONVERTIBLE STROLLER-CYCLE

BACKGROUND OF THE INVENTION

1. Field of the Invention

This application is a divisional of U.S. patent application Ser. No. 11/898,791 to Ehrenreich et al. The present invention relates to a vehicle that is converted from a stroller for carrying a passenger and cycle operated by a rider to a combined unit. The vehicle is steerable with handlebars mounted on a pivoting handlebar assembly and combinable with an operator-powered bicycle to form a stroller-cycle. More specifically, the invention relates to a stroller and a bicycle combined physically and operationally, such that the operator of the cycle portion of the stroller-cycle can control the braking and steering operation of the stroller portion while the stroller-cycle is in motion. Additionally, the invention relates to a quick release/assembly control system provided in the steering column of the stroller-cycle assembly and a cable splicing assembly for combining the braking systems of the cycle and stroller portions of the vehicle.

2. Description of the Related Art

Many child stroller designs and operator-powered bicycles and tricycles are well-known in the art. One such stroller design is disclosed in U.S. Pat. No. 5,590,896 to Eichhorn.

Eichhorn discloses a three-wheeled collapsible stroller having a front wheel assembly 320 that is selectively lockable into a straight-ahead position. The stroller includes independently removable rear wheels 260 and 270 and brake mechanisms to prevent rotation of the rear wheels 260 and 270. A fabric seat assembly 800, for carrying a child, is supported between a handle tube 20 and front tubes 40 and 45. A seat-back 801 of the seat assembly 800 can be oriented in an upright or reclined position. In the fully extended, unfolded configuration, optional spring-loaded latch handles 140 and 150 operate to lock the stroller into the unfolded configuration. When converted into the collapsed configuration, the handle tube 20 rotates downwardly, causing front tubes 40 and 45 to rotate downwardly, thereby bringing the front wheel assembly 320 towards the rear wheels 260 and 270.

A second stroller device is disclosed in U.S. Pat. No. 5,558,357 to Wang. Wang discloses a foldable three-wheeled trolley that can accommodate a seat for carrying a baby between a pair of push members 60. The trolley includes a straight main body 10, a slide member 20 slideable thereon, a fork 11 at a front end, and two transverse axle units 50 at a back end. The slide member 20 connects to back ends of a pair of support rods 60 via a U-shaped member 30 pivotably connected at both ends. When reconfiguring the trolley for transport or storage, the slide member 20 slides forward along the main body 10, rotating support rods 60 downward and the transverse axle units 50 forward and retracting rear wheels 54 alongside main body 10.

U.S. Pat. No. 5,562,300 to Nelson discloses a stroller having a tricycle configuration capable of carrying at least one child safety seat. The stroller has foldable right and left handlebars 40 and 42 attached at a back end of parallel right and left longitudinal frame members 30 and 32. A front wheel 12 removably attaches between frame members 30 and 32 at their respective front ends. The stroller also includes parallel first and second lateral members 18 and 20 having V-shaped end members 22 at opposing ends thereof to which main wheels 14 and 16 removably attach. The first and second lateral members 18 and 20, along with right and left lateral seat latch attachment rods 48 and 50, provide for mounting at least one child seat thereto.

U.S. patent application Publication No. US 2001/0035626 A1 to Kettler discloses a tricycle comprising a front frame 6, a rear frame 1, and an intermediate frame 12. The front frame 6 includes a handlebar 8, a front wheel 10, pedals 22 for driving the front wheel 10, and an inner telescopic tube 17 at a back end. The rear frame 1 includes a first seat 5, an outer telescopic tube 16, and a rear axle 2 with rear wheels 3 and 4 mounted at opposing ends thereof. The inner telescopic tube 17 of the front frame 6 is slideable into the outer telescopic tube 16 of the rear frame and can be locked at different positions therein. The intermediate frame 12 includes a second seat 13, lateral foot rests 15, a holding element 14, an outer telescopic tube 16 at a front end, and an inner telescopic tube 17 at a back end. In an alternate configuration, the inner telescopic tube 17 of the front frame 6 is slideable into the telescopic tube 16 of the intermediate frame 12 and lockable at several positions therein, while the outer telescopic tube 16 of the intermediate frame 12 is slideable over the inner telescopic tube 17 of the rear frame 1, and is also lockable at several positions therein. Therefore, Kettler discloses a tricycle that can be lengthened to accommodate a second rider by inserting the intermediate frame 12 between the front and rear frames 6 and 1. Additionally, the tricycle's length can be varied depending on the locking position(s) of the inner telescopic tube(s) 17 within the outer telescopic tube(s) 16.

U.S. Pat. No. 6,164,666 to Prea discloses a bicycle convertible into a tricycle and vice versa. In the tricycle configuration, an axle 9, having both a tricycle axle 36 and a bicycle axle 37, mounts to a back end of a single-beam arm 13. In the bicycle configuration, the bicycle axle 37 is detached from the tricycle axle 36 and mounted to the back end of the single-beam arm 13, wherein a wheel 8 mounted at an end of the bicycle axle 37 opposite the single-beam arm 13 longitudinally aligns with a steerable front wheel 3. The bicycle also includes a seat 1, handlebars 2, a frame 4, and pedals 5 and 6.

Next, U.S. patent application Publication No. US 2003/0151225 to Lopez discloses a tricycle having a single tube frame with a front portion 40 and a rear portion 44. Adjustable handlebars 37, a front fork 42, and a front wheel 26 attach to a front end of the frame while foldable brackets 48 and a foldable seat 72 mount at a back end thereof. A rotatable pedal crank mounts to a bracket 47 extending from the front fork 42 for driving the front wheel 26 via a continuous chain 32. The foldable brackets 48 pivotably attach to the rear portion 44 at one end and pivotably attach to a bracket 64 at an opposing end. A rear wheel 25 attaches to an outer end of each bracket 64. By releasing pin 62 from a mating plate 61, the brackets 48 fold forward, collapsing the foldable seat 72 while rear wheels 25 remain substantially parallel due to hinged brackets 64. The tricycle alternately includes an intermediate member disposed between the front portion 40 and rear portion 44 lengthening the tricycle and providing a tandem seating arrangement for two passengers.

Finally, U.S. Pat. No. 2,468,933 to Jones discloses a two-wheeled vehicle that is convertible from a two-wheeled scooter to a bicycle and vice versa. The vehicle is essentially a push scooter including a frame 13, rear and front wheels 1 and 2, a footrest 16 disposed between longitudinal extending frame tubes 14 and 15, and adjustable handlebars 5b for steering. Additionally, an arcuate-shaped support 25, including a seat 19, foot pedals 20 and 21, and a pulley 46, can easily be attached and removed from the frame 13, converting the vehicle from a two-wheeled scooter into a bicycle and vice versa. When the arcuate-shaped support 25 is attached to the frame, a belt 47 slips onto the pulley 46 and a second pulley 45 for transferring the motion of the pedals 20 and 21 to the rear wheel 1 to drive the vehicle.

Although the related art described above discloses strollers having the capability to fold in a compact manner for storage or transportation, vehicles extendable by adding additional frame members, and vehicles convertible from a two-wheeled orientation to a three-wheeled orientation, the related art fails to disclose converting a steerable and pushable stroller for carrying a passenger, such as a child, and a separate bicycle into a rideable operator-powered stroller-cycle by combining the vehicles both physically and operationally.

SUMMARY OF THE INVENTION

The present invention relates to a combination stroller-cycle vehicle. The stroller-cycle is a vehicle for pushing and riding. The vehicle includes a frame having a front portion and a rear portion. The front portion of the frame has a lower connection post containing braking and steering components and the rear portion of the frame has an upper connection post containing braking and steering components for the rear portion. The upper and lower connection posts can be rigidly engaged, for example, threadedly engaged within a steering portion of the frame. A hitch beam is disposed on the front portion of the frame. An attaching mechanism, such as, for example, a hitch clamp, is disposed on the rear portion of the frame being fastened around the hitch beam for connecting the front portion and the rear portion. A pair of front wheels are operationally connected to the front portion of the frame and at least one rear wheel is operationally connected to the rear portion of the frame.

A brake lever on the riding section of the vehicle controls a first front brake cable. A rotatable front knob disposed in the stem of the vehicle has a central aperture. An upper connection post has an upper end and a lower threaded end. An outer surface of the upper end engages a lower inner surface or lower portion of the central aperture of the rotatable front knob. A lower connection post is aligned with the upper connection post. The lower connection post has a cable slide therein, the cable slide having a threaded aperture at an upper end. A cable rod has a first end slidably disposed within the upper connection post and a second end threadedly connected to an inner surface of the cable slide in the lower connection post. A cable adjuster is partially disposed within and threadedly connected to an upper inner surface or upper portion of the central aperture of the rotatable front knob. A coil spring is arranged between the cable rod and the cable adjuster. A cable stop is disposed at an end of the cable rod for clamping a terminal end of the first front brake cable. The first front brake cable extends from the brake lever through the cable adjuster, the spring and the cable rod and terminates at the cable stop. The lower connection post includes a second front brake cable that extends from a pair of front wheels of the vehicle and terminates in the cable slide.

The present invention also relates to a method of making a vehicle for pushing and riding including providing a pushing section and a riding section of a frame. The riding section of the frame includes a front wheel and at least one rear wheel. The front wheel is removed from the riding section. A lower connection post of the pushing section is inserted into a steerer portion on the riding section for engagement with an upper connection post in the steerer portion. A hitch beam on the pushing section is aligned with a hitch clamp on the riding section. The hitch clamp is then closed around the hitch beam. In order to secure the upper connection post and the lower connection post, a front knob at an upper end of the upper connection post is rotated, causing a rotation of the upper connection and a lower end thereof to move toward and into the threaded aperture of the upper end of the lower connection post.

The present invention also relates to a cable splicing assembly for guiding therethrough a pair of control cables in the vehicle. The cable splicing assembly includes a splice housing having a circumferential opening at a first end and a pair of apertures at an opposite second end. A piston is configured to slide axially within the splice housing between the opposite ends thereof in response to movement of the pair of control cables. The piston has an opening therethrough for guiding the pair of control cables through a longitudinal length. A housing cap is mounted around the first end of the splice housing to close the circumferential opening of the splice housing and to form a cavity with the first end of the splice housing.

The present invention further relates to a method of providing braking from a riding section to a pushing section in the vehicle. The method includes providing a first front brake cable from a braking portion of the riding section into a steering portion of the riding section. A second front brake cable from the steering portion of the riding section is provided to a braking portion of the pushing section. The second front brake cable is inserted into a cable splicing assembly having a concentrically arranged housing cap, piston and housing assembly. The second front brake cable is secured with at least one set screw threadedly inserted into the piston from an outer circumferential surface thereof. A pushing section having a parking brake cable is also provided. The parking brake cable of the pushing section is inserted into the cable splicing assembly and secured with at least one set screw threadedly inserted into the piston from an outer circumferential surface thereof.

BRIEF DESCRIPTION OF THE DRAWINGS

The features of the invention will be more readily understood with reference to the following description and the attached drawings, wherein:

FIGS. 2A to 2C illustrate an exemplary stroller for the stroller-cycle frame and casters of the pushing section;

FIGS. 3A and 3B illustrate an exemplary cycle for the stroller-cycle frame and detailed view of the fork-steerer tube;

FIGS. 7A to 7D illustrate a pushbar mechanism;

FIGS. 8A to 8E illustrate a folding mechanism for folding the pushing section;

FIGS. 12A to 12C illustrate the braking and steering assembly of the pushing section;

FIGS. 18A and 18B illustrate an exploded view of the cable splicing assembly;

DETAILED DESCRIPTION OF THE INVENTION

Figure 1:
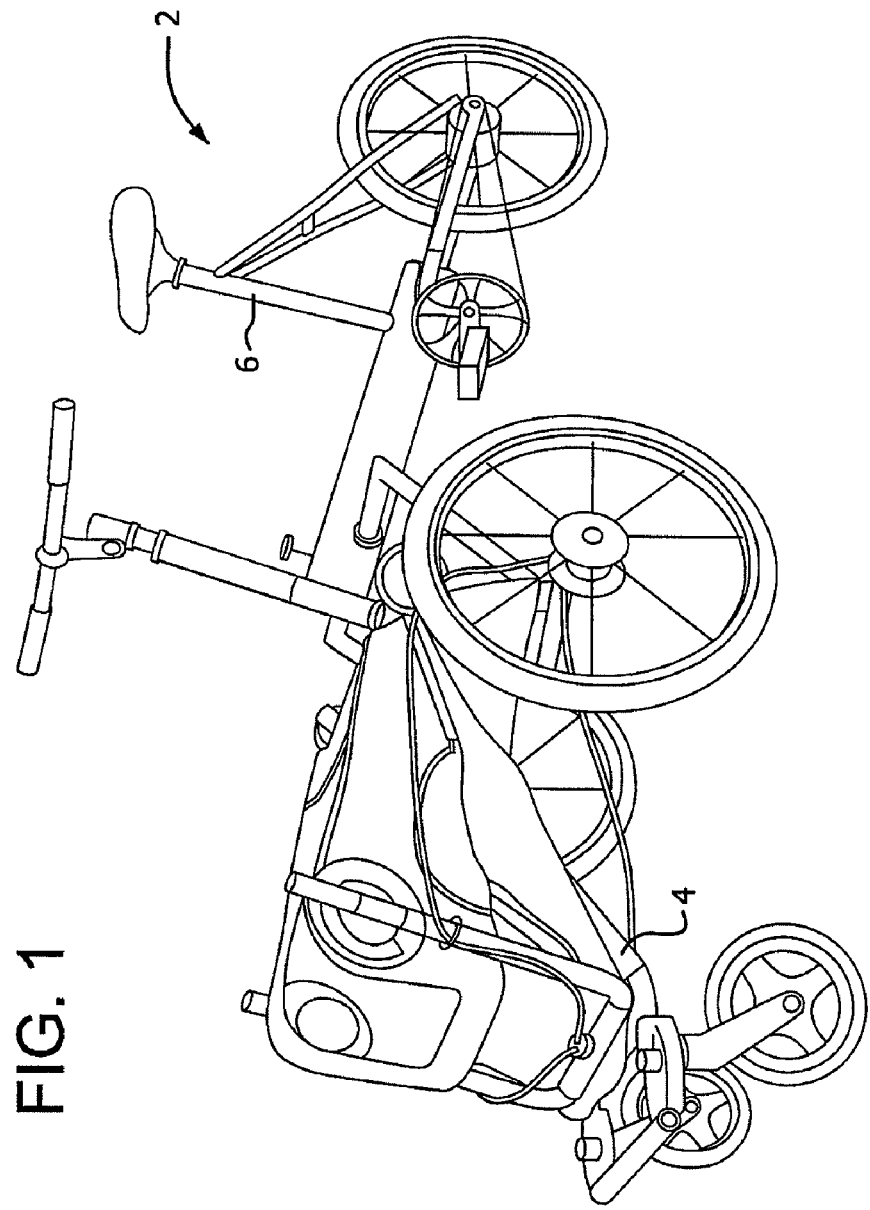
FIG. 1 illustrates a fully assembled stroller-cycle frame and stroller cover according to a preferred embodiment of the present invention.

In the different figures, the same reference numerals designate identical or similar features or components.

The present invention is related to a vehicle 2 for pushing and riding, for example, a vehicle such as a convertible stroller and cycle wherein the stroller can be pushed while the cycle is ridden. FIGS. 1-4 illustrate a vehicle 2 for pushing and riding having a frame including a pushing section and a riding section. FIG. 1 shows a fully assembled vehicle for pushing and riding including a covering and seat for the passenger seating area of the pushing section. FIG. 2 shows the stroller forming the pushing section 4. FIG. 3A shows the cycle 5 forming the riding section 6.

The stroller forming the pushing section 4 as shown in FIG. 2, has a pair of wheels 12, each with a brake 14, such as, for example, a built-in internal drum brake hub 25 and a quick release axle 16. In addition, the pushing section 4 has, in a direction from the front to the rear, a seating area including a front bumper 18, foot support bar 20, knee support beam 22 and cross beam 24 laterally arranged for the comfort of the passenger. The seating portion of the pushing section 4 is connected by pushing section side frames 26. The pushing section 4 also includes a U-shaped steering frame 28 substantially orthogonal to and extending from the cross beam 24. The steering frame 28 includes a hitch beam 30 for connecting the pushing section 4 to the riding section 6. A further connection between the pushing section 4 and the riding section 6 is provided by a hitch post or lower connection post 32 that will be described below.

Figure 2B:
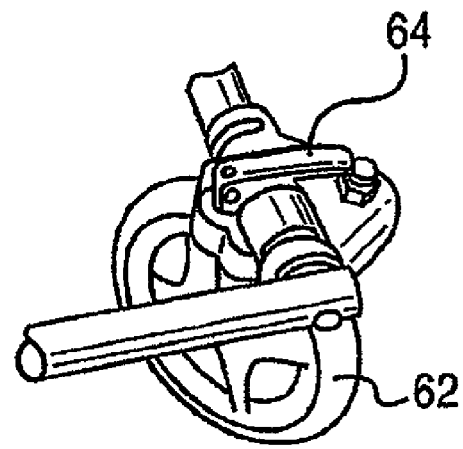
Figure 2C:
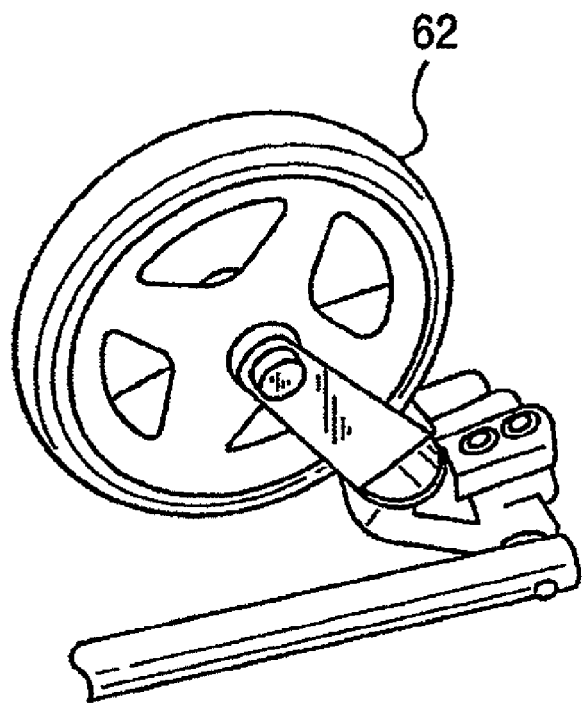

The front portion or pushing section of the vehicle frame has a pair of casters 62 at a front end thereof for balancing the front portion when the front portion operates separately from the rear portion. The casters 62 are pivotable for operation and nonoperation with a quick release lever 64 as shown in FIGS. 2B and 2C. For example, when the pushing section 4 is a stroller and operates separately from the rear portion or riding section 6, the casters 62 are pivotable downward in an operational state to balance the stroller. When the pushing section 4 is combined with the rear portion or riding section 6, the casters 62 are pivotable upward and fastened in a non-operational state as shown in FIG. 2B.

The cycle 5, which forms the riding section 6, as shown in FIG. 3A, is illustrated as having a single front wheel 7 and rear wheel 8, for example. A cycle fork holds the front wheel 7 and allows the operator to steer. The fork is connected through a hollow fork-steerer tube 36 to the head tube 10 and stem 38 to the handlebars 40. The handlebars 40 have a brake lever 42 mounted thereto. The stem 38 is hollow so as to insert the front braking and steering assembly for the stroller-cycle 2.

In the front braking and steering assembly, a front connection knob 44 is inserted into the stem 38 and is rotatably tightened and loosened to control the connection and disconnection, respectively, of the front braking and steering assembly for the stroller-cycle 2. The cycle 5, forming the riding section 6, also includes a hitching assembly 46 on the downtube 48 of the cycle 5. The hitching assembly 46 includes an attaching mechanism or hitch clamp 50 and a hitch pin for allowing the hitch clamp to pivot in the open and closed positions on the downtube 48 of the riding section 6.

The cycle 5 can be formed of an aluminum frame, for example. The seat post of the cycle can have a quick release mechanism for removing the seat. The rear wheel 8 of the cycle 5 can have mounted thereon a multi-speed internal geared hub for changing the gears of the cycle 5.

Figure 3B:
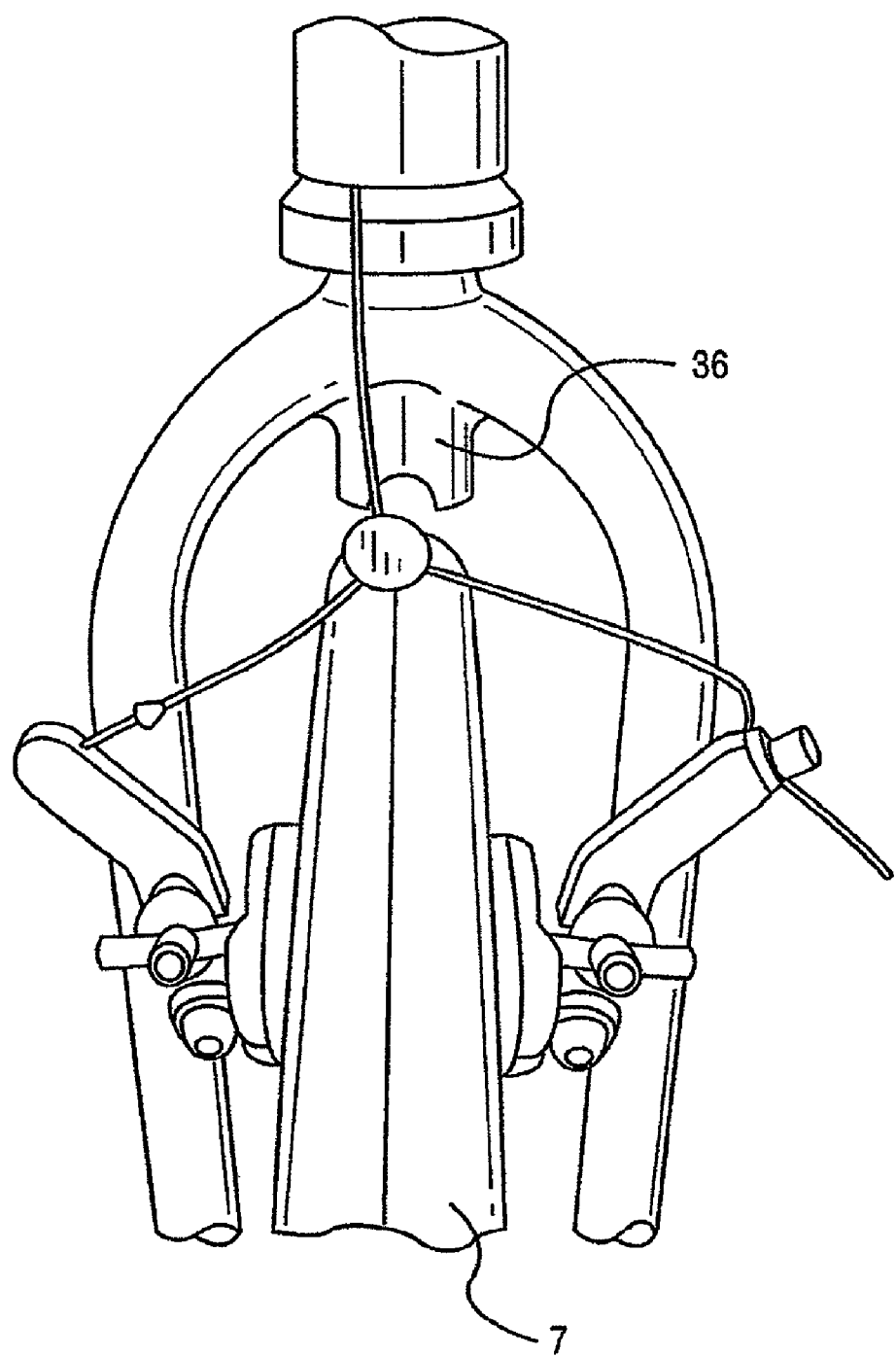

In the present invention, a separate stroller and cycle can be easily and quickly converted to the stroller-cycle 2 of the present invention without tools so that a cycle operator can transport a stroller passenger. The conversion of a separate stroller and cycle to a convertible stroller-cycle 2 is accomplished by removing the front wheel 7 of the cycle 5 shown in FIG. 3A to form a riding section 6. Then, the related front wheel braking components shown FIG. 3B are disconnected. The pushing section 4 is then attached to the front of the cycle 5 in place of the cycle front wheel. The cycle and stroller braking controls are combined in the steering column or head tube 10 of the riding section 6 so that the operator can control the braking action of both the riding section 6 and the pushing section 4 of the stroller-cycle 2. In the present invention, the term cycle includes a bicycle, tricycle or tandem cycle or any other operator-powered cycle. The present invention considers that the term cycle also includes an electrical or fuel-powered cycle. The connection between the riding section 6 and pushing section 4 of the convertible stroller-cycle 2 will now be described.

Figure 4:
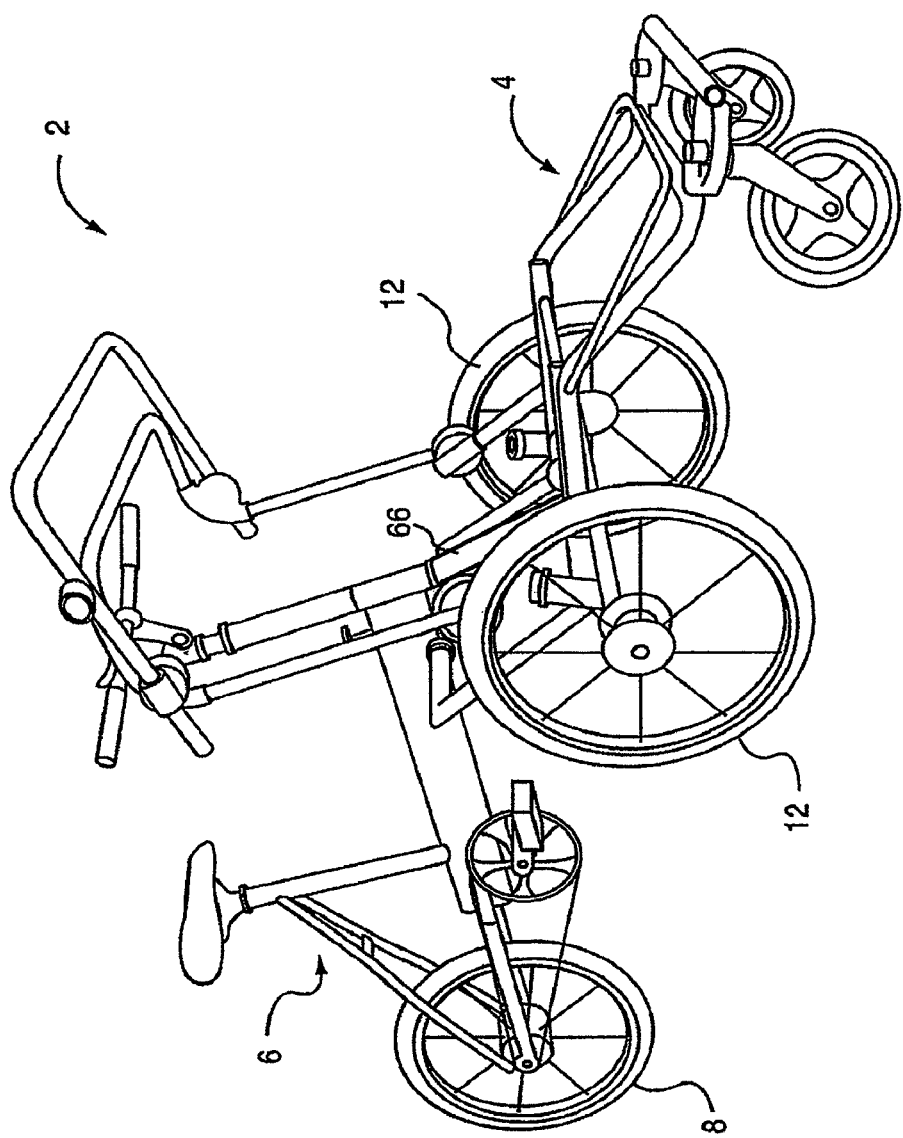
FIG. 4 illustrates the stroller-cycle frame.

FIG. 4 shows a perspective view of the completed frame for the vehicle for pushing and riding having a front portion and a rear portion. The front portion includes the pushing section 4, having a passenger seating area, and the rear portion includes the riding section 6, having an operator seating area. The front portion of the frame has a lower connection post containing the braking and steering components for the front portion. The rear portion of the frame has an upper connection post containing the braking and steering components for the rear portion. The upper and lower connection posts can be threadedly engaged, interference-fit or fastened by another method within the head tube 10 of the frame. The pair of front wheels 12 is operationally connected to the front portion of the vehicle frame and at least one rear wheel 8 is operationally connected to the rear portion of the vehicle frame. The rear wheel 8 can be a single wheel as shown in FIG. 4 or can be a plurality of in-line wheels such as in a tandem cycle.

Figure 5A:
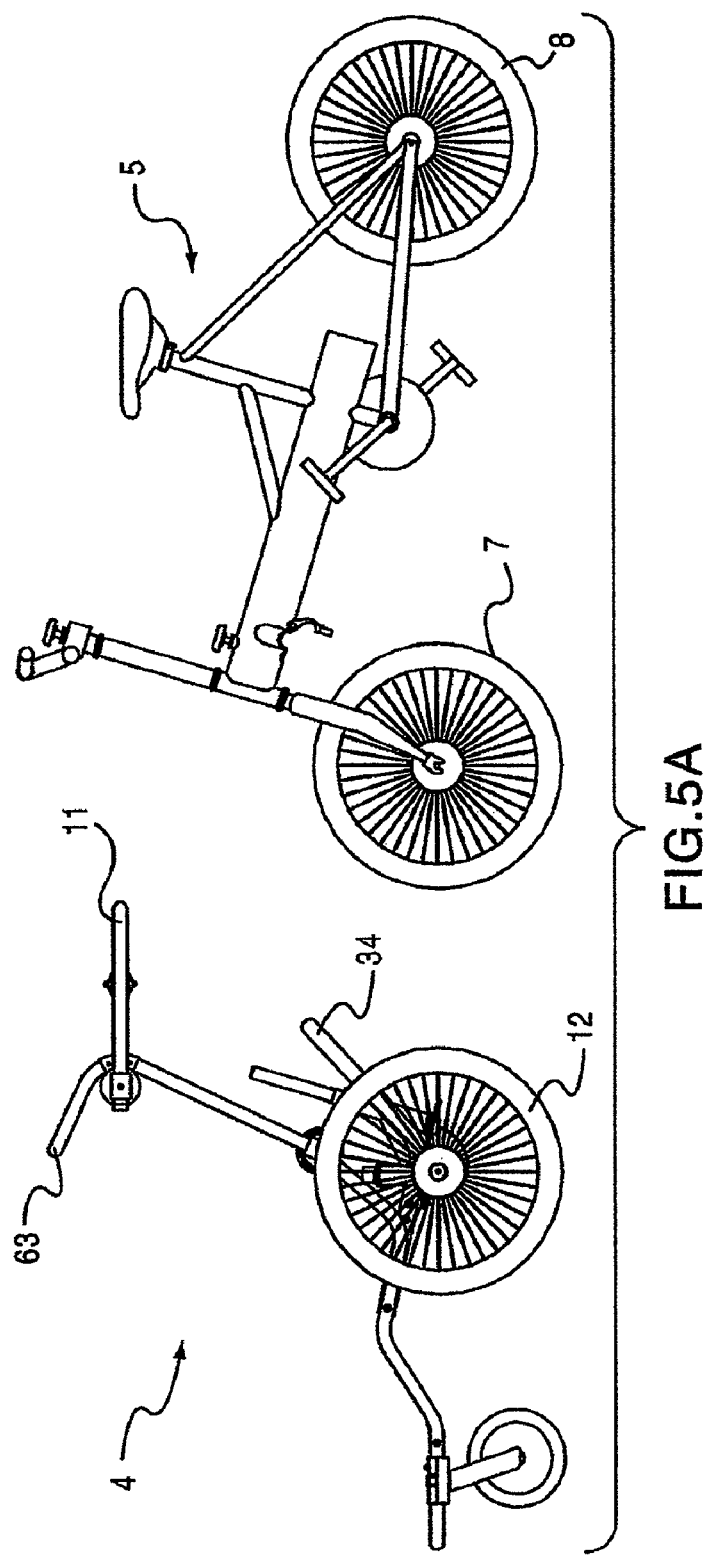
FIGS. 5A to 5E illustrate the assembly steps for the stroller-cycle.
Figure 5B:
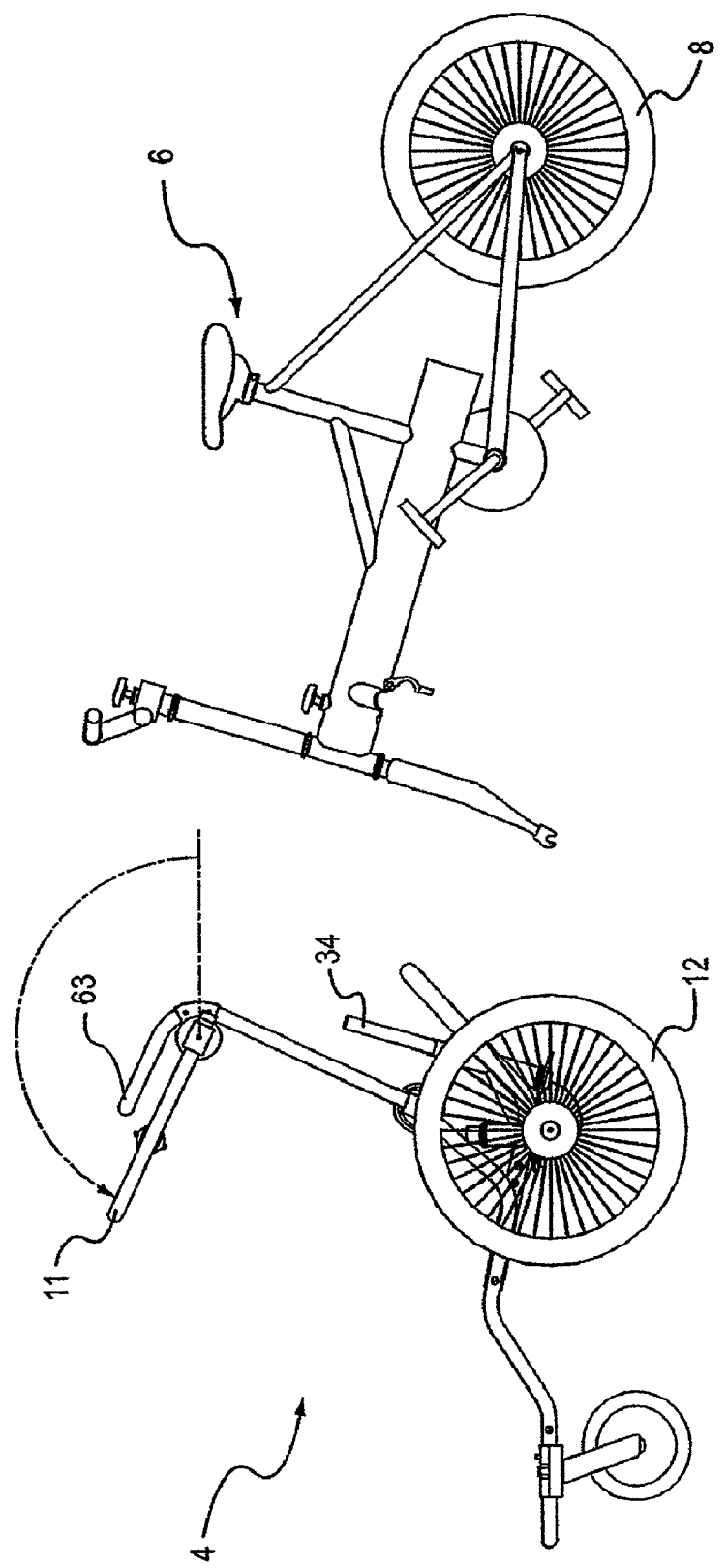
Figure 5C:
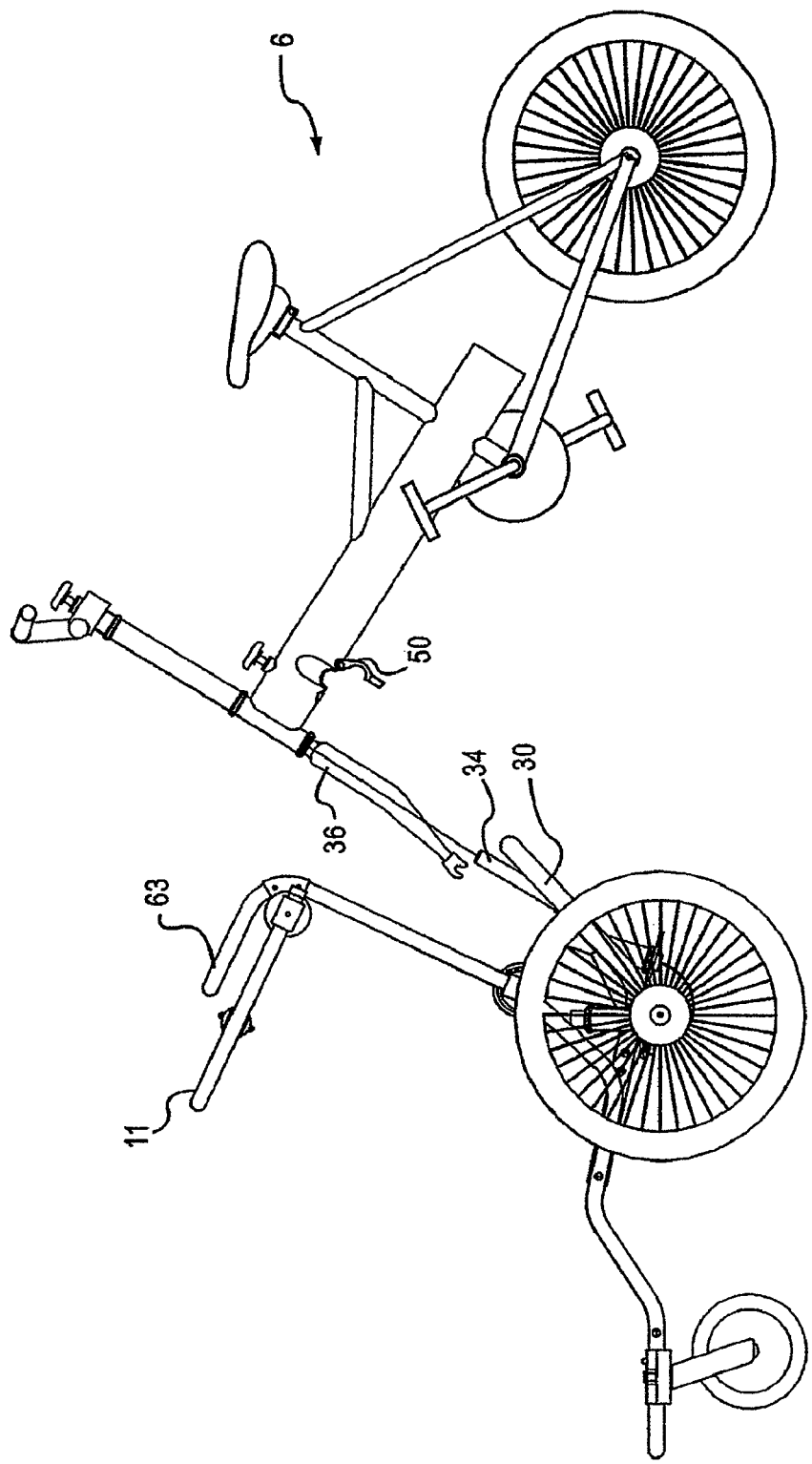
Figure 5D:
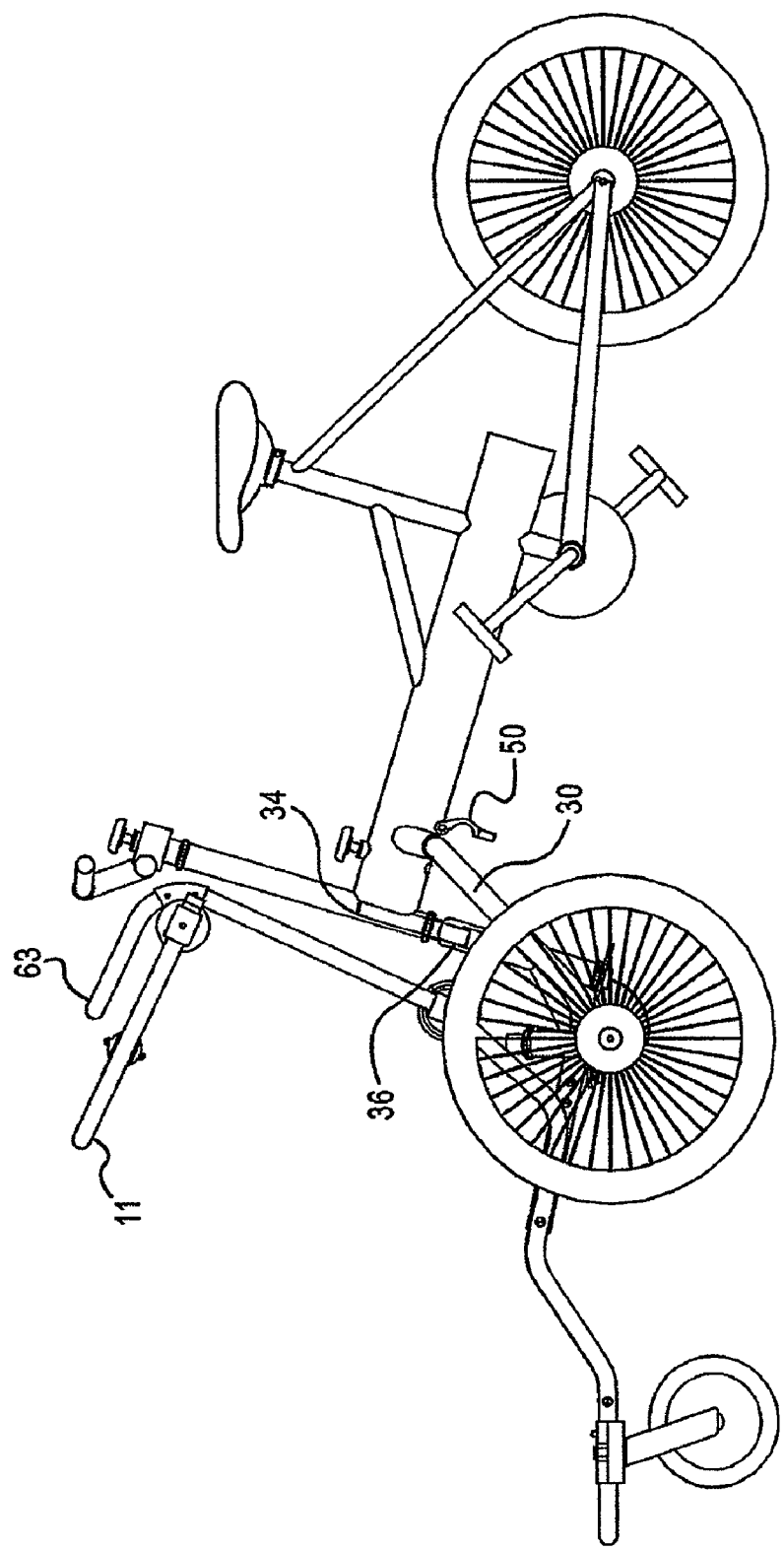
Figure 5E:
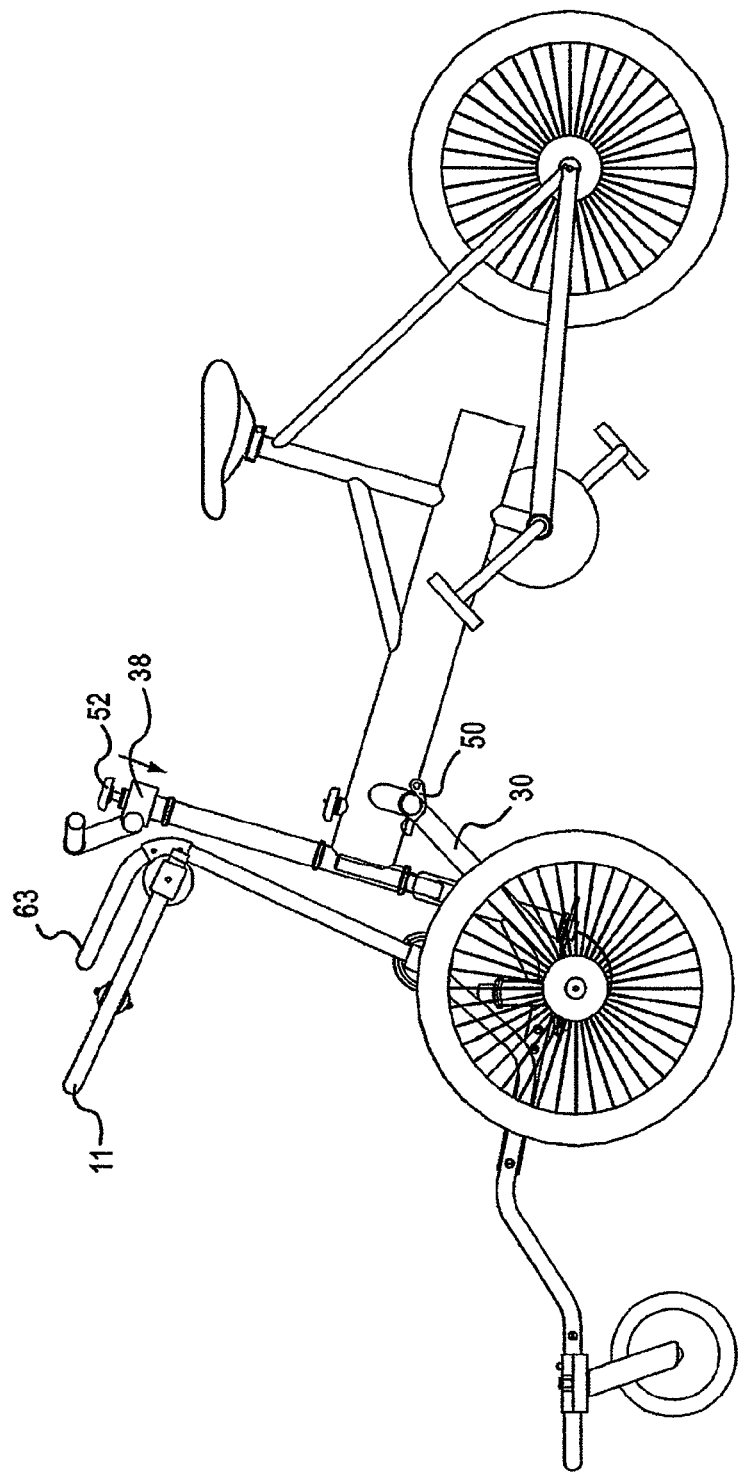

FIGS. 5A through 5E illustrate a conversion from the separate stroller and cycle to the stroller-cycle 2 shown in FIG. 4. FIG. 5A illustrates the stroller forming the pushing section 4 and the cycle 5 forming the riding section 6. FIG. 5B illustrates the removal of the front wheel 7 from the cycle 5 and the rotation and locking of the stroller push bar 11 from a direction toward the rear of the stroller to a direction toward the front of the stroller. FIG. 5C illustrates the alignment of the center of the cycle hollow fork-steerer tube 36 with the lower connection post 34 on the pushing section 4. FIG. 50 illustrates the sliding of the hollow fork-steerer tube 36 over the top of the lower connection post 34, or alternatively, the insertion of the lower connection post into the hollow fork-steerer tube 36. In addition, FIG. 50 illustrates the positioning of the hitch beam 30 of the pushing section 4 in the hitch clamp 50 of the riding section 6. FIG. 5E illustrates the tightening of the front connection knob 52 into the stem 38 for connecting the braking and steering assembly of the riding section 6 with the braking and steering assembly of the pushing section 4 and the closing of the hitch clamp 50 around the hitch beam 30.

Figure 6A:
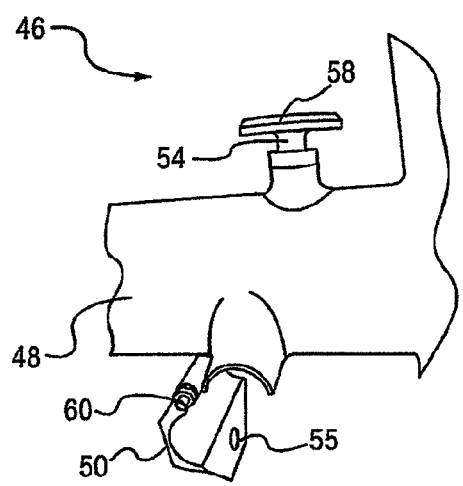
FIGS. 6A to 6D illustrate the hitch assembly.
Figure 6B:
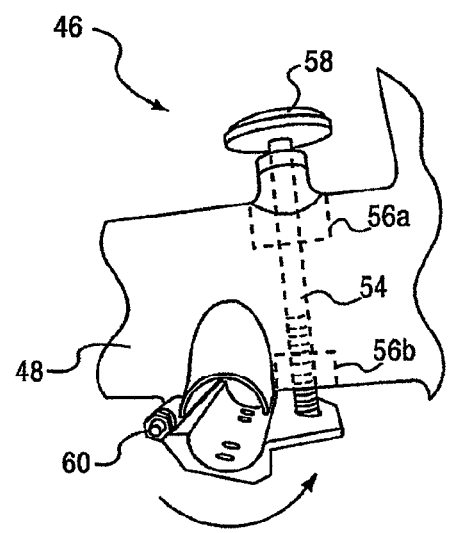
Figure 6C:
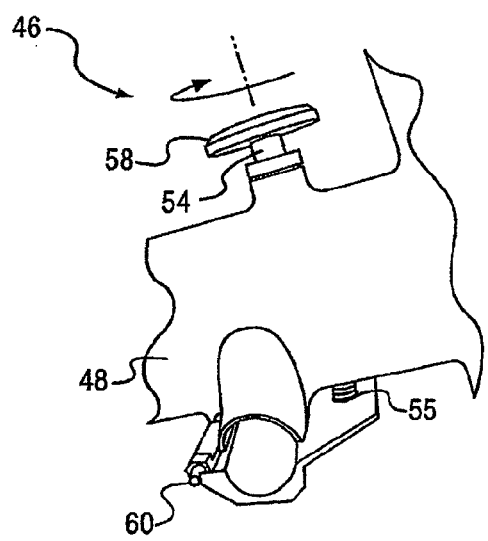
Figure 6D:
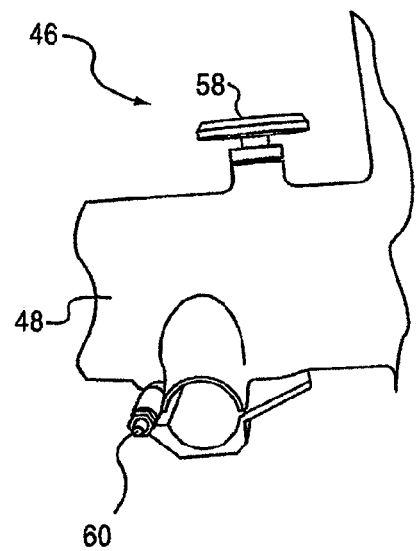

The hitch clamp 50 is controlled by a hitching assembly 46, as shown in FIGS. 6A through 6D. The hitching assembly 46 includes a threaded hitch knob rod 54 that is inserted substantially vertically into an aperture in the downtube 48 of the riding section 6. The hitch knob rod 54 is guided within the aperture by a knob top retainer 56a disposed at an entrance side and a knob bottom retainer 56b at an exit side of the aperture. The knob top retainer 56a and knob bottom retainer 56b have inner surfaces into which the hitch knob rod 54 is slidably inserted. The upper end of the hitch knob rod 54 is located on an upper side of the downtube and has a hitch knob 58 for rotating the hitch knob rod. The lower end of the hitch knob rod 54 has threads for threadedly connecting with a threaded aperture 55 in the attaching mechanism or hitch clamp 50 disposed on an underside of the downtube. FIG. 6B shows that the hitch knob rod 54 can be threadedly inserted into the hitch clamp 50 and that through the rotation of the hitch knob 58 the hitch knob rod 54 moves the hitch clamp 50 relative to the hitch beam 30 on the pushing section 4. Rotation of the hitch knob 58, as shown in FIG. 6C, closes and tightens the hitch clamp 50 to secure the hitch beam 30 of the front portion to the rear portion of the vehicle frame, shown in FIG. 5E. Other methods of securing the hitch clamp 50 around the hitch beam 30 include a push-button release mechanism, wherein the hitch knob 58 is pushed downward so that the hitch knob rod 54 attaches to and holds the hitch clamp 50 in place around the hitch beam 30. A hinge pin 60 allows the hitch clamp 50 to pivot in the open and closed positions.

FIGS. 7A-7D illustrate a pushbar 11 of the present invention. The pushbar 11 can be gripped by a user to control the direction and speed of the pushing section 4 when the pushing section is being used as a stroller alone. The pushbar 11 can be connected to a back frame 63, so that the push bar 11 can pivot with respect to the back frame 63. The push bar 11 can be covered with a shock absorbent or pliant material 37, such as foam, to provide a soft surface for the user's hands when the user is pushing the stroller.

Figure 7A:
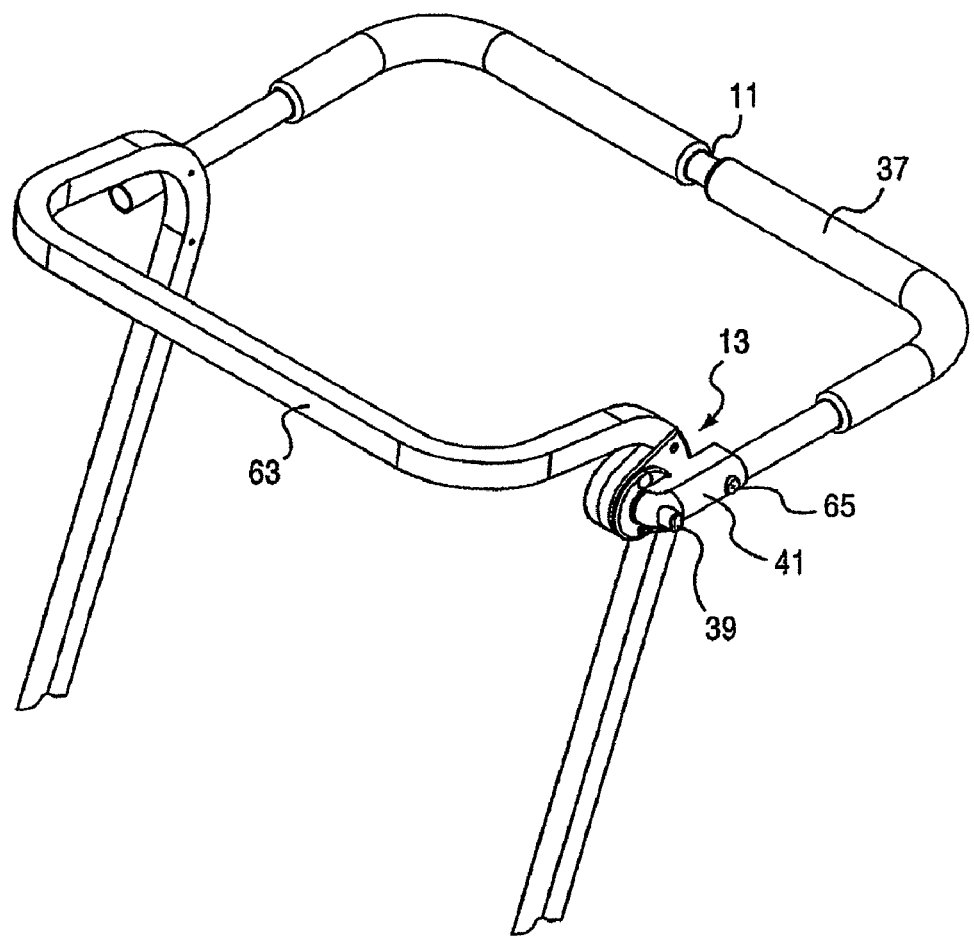
Figure 7C:
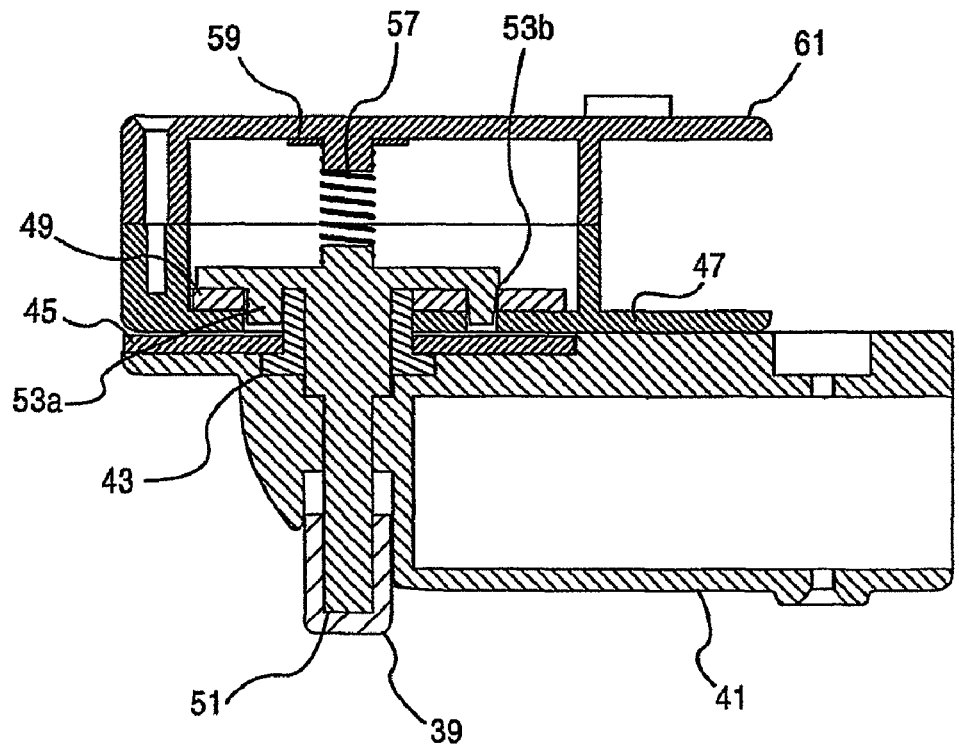

The pushbar 11 in FIG. 7A is illustrated as a U-shaped member, but the pushbar can have any shape having opposite and parallel ends to allow the functionality discussed herein. The parallel ends 11a, 11b of the pushbar 11 are inserted into pushbar housings 41 mounted on the arms 63a, 63b of the back frame 63 by attaching members 65, such as screws. For clarity, only one of the pushbar housings 41 is shown in FIGS. 7A and 7B.

A pair of pushbar mechanisms 13 is mounted on the first and second arms 63a, 63b of the back frame 63 and adjusts the relative position of the pushbar 11 to a back frame 63 of a pushing section in the convertible stroller-cycle 2. For clarity, only one of the push bar mechanisms 13 is shown in FIGS. 7A and 7B. The push bar mechanisms 13 allow the pushbar 11 to pivot to multiple positions, including a direction facing a rear side of the pushing section 4 and a direction facing the front side of the pushing section, when the pushing section is connected to the riding section 6. As shown in FIG. 7B, the components of the pushbar mechanism 13 are disposed between the push bar housing 41, a push bar mechanism housing cover 47 and push bar mechanism housing base 61. The push bar mechanism housing cover 47 is connected on an inner side to the push bar mechanism housing base 61 and on an outer side to the pushbar housing 41.

Figure 7D:
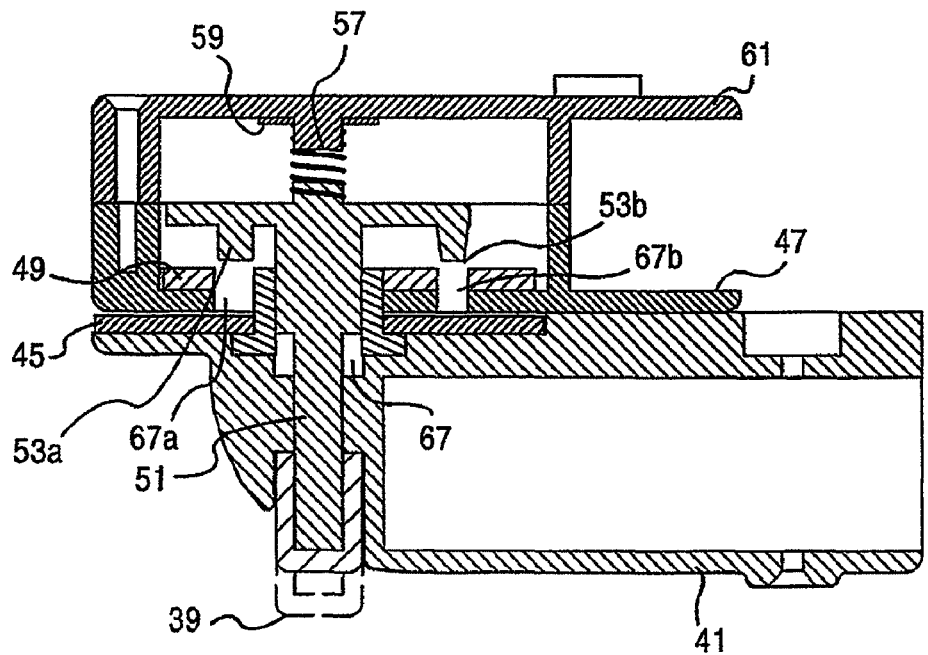

In between the pushbar mechanism housing base 61 and the pushbar mechanism housing cover 47 is a position plate 49 adapted to be fixed relative to the pushbar 11. The position plate 49 has a central aperture, a plurality of auxiliary apertures 67a extending radially from the central aperture 67 and a plurality of engaging apertures 67b as shown in FIG. 7D. A position pin device includes a central pin 51 mounted on a base. The position pin 51 has a proximal end attached to the base and a distal end. A first locating pin 53a and a second locating pin 53b are disposed adjacent to the proximal end of the central pin 51 and are also mounted on the base. The central pin 51 is adapted to pass through the central aperture of the position plate 49 and extend through the push bar mechanism housing cover 47 to the outside of the pushbar mechanism 13 where the central pin 51 is capped by a position pin button 39. The first locating pin 53a is adapted to pass through one of the plurality of auxiliary apertures and the second locating pin 53b is adapted to pass through the plurality of engaging apertures to fix the pushbar 11 relative to the back frame 63 in one of a plurality of positions. A biasing member 57, such as a coil spring, urges the position pin device into engagement with the position plate 49.

The position pin button 39 disengages the first locating pin 53a from the auxiliary aperture and the second locating pin 53b from one of the plurality of engaging apertures so that the pushbar 11 can move from a first position to a second position. The position pin button 39 is prevented from disengaging the locating pins 53a, 53b when a force applied by the biasing member 57 exceeds a predetermined amount.

As shown in FIGS. 7A and 7B, the central pin 51 is longer than the first and second locating pins 53a and 53b, respectively, such that the central pin 51 can extend to the outside of the push bar mechanism 13 to be accessible to the user. The first locating pin 53a is rectangular shaped and can only be inserted into the auxiliary apertures in one direction. The second locating pin 53b is tapered to have a diameter with a proximal end that is wider than the diameter of the distal end.

The auxiliary apertures are integral with the central aperture so that one end of the auxiliary aperture begins at the outer edge of the central aperture. The auxiliary apertures extend radially from the central aperture and have the same shape as the first locating pin 53a, so that the first locating pin can be secured in the auxiliary apertures.

A position plate bolt 43 on the outer side of the back frame 63 is threadedly inserted into a position plate 49 located on an inner side of the back frame 63. The position plate bolt 43 holds the position plate 49 to the pushbar mount housing 47. A pushbar housing washer 45 having a central aperture is disposed on an outer surface of the pushbar mount housing 47 and allows the position plate bolt 43 to smoothly rotate therein without causing wear. The central apertures of the position plate 49, push bar mount housing 47, pushbar housing washer 45 and position plate bolt 43 are aligned so that the position pin 51 can be inserted therethrough from the position plate 49 to the pushbar housing 41 where the end of the position pin 51 is capped by the position pin button 39.

Releasing the first and second locating pins 53a and 53b from the position plate 49 so that the push bar 11 can pivot with respect to the back frame 63 is shown in FIG. 7D. The dotted lines in FIG. 7D illustrate the initial position of the push button 39 and the solid lines illustrate the depressed pushbutton 39. The depressed pushbutton 39 pushes the position pin away from the position plate 49, thereby releasing the adjacent first and second locating pins 53a and 53b from the apertures 67a and 67b in the position plate 49. With the position pin 51 depressed, the first and second locating pins 53a and 53b are released from their respective apertures, and the pushbar 11 is allowed to rotate freely. When the user releases the pushbutton 39, the first and second locating pins 53a and 53b return to their respective apertures 67a and 67b in the position plate 49 under the force of the spring 57, thereby locking the mechanism 13 and preventing the pushbar 11 from rotating freely.

The materials for the push bar mechanism can be metal or plastic, a combination of metal and plastic or a combination of other materials.

Figure 8A:
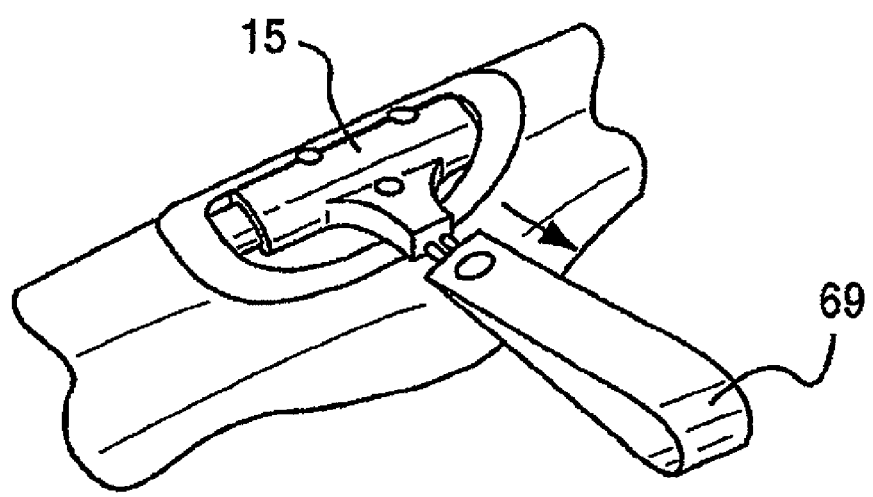
Figure 8B:
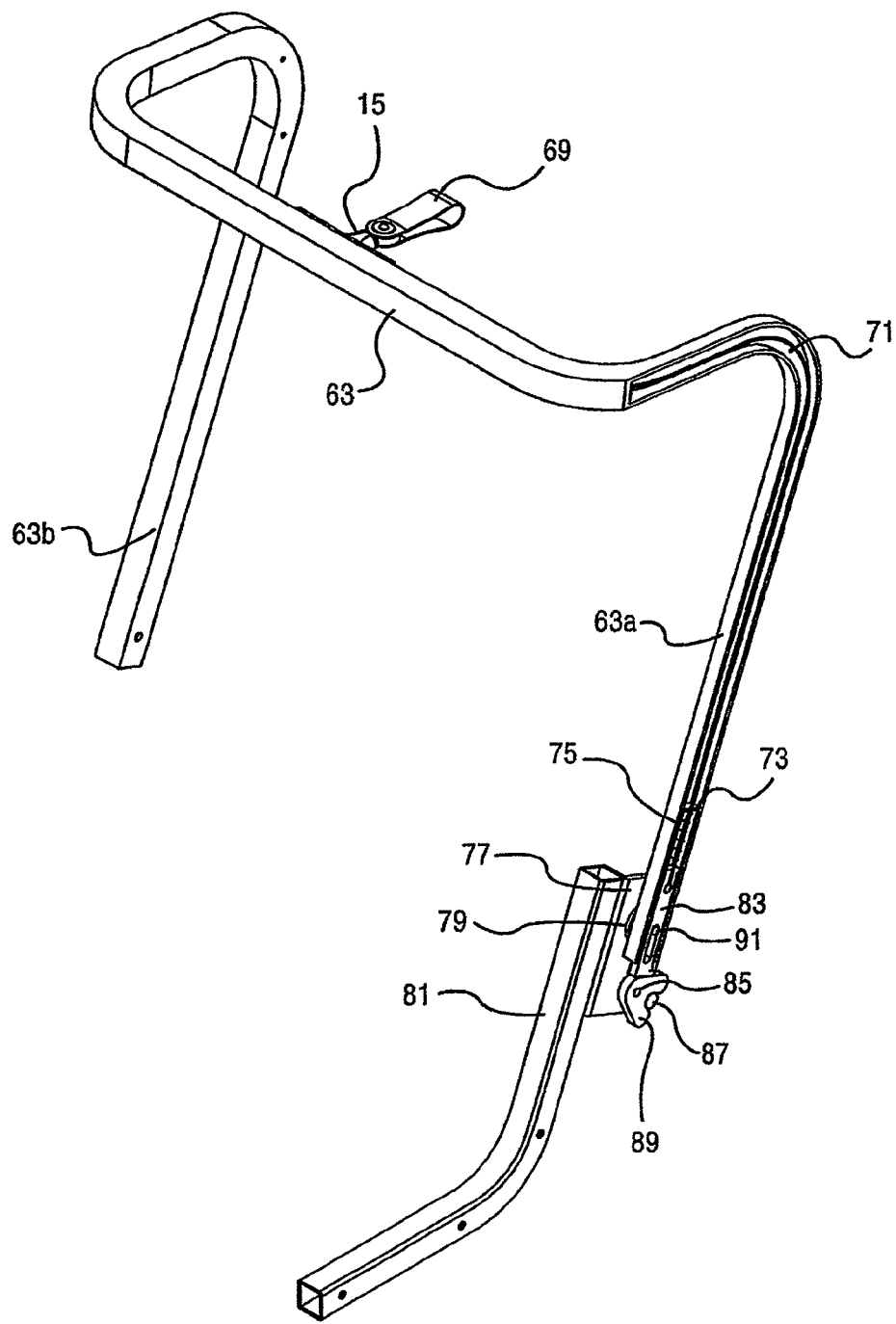

FIGS. 8A-8E illustrate a folding mechanism 15 for folding the pushbar 11 to and from a position for configuring the back frame 63 of the pushing section 4 of the convertible stroller-cycle 2 to form a passenger enclosure, such as the enclosure shown in FIG. 1. The folding mechanism includes a fold strut 81 and the back frame 63 pivotally connected to the fold strut through a fold bracket 77. The back frame 63 is hollow so as to have threaded therethrough a pair of pull cords 71, 71, each pull cord extending symmetrically from each arm 63a, 63b of the back frame 63, as shown in FIGS. 8B and 8C. The pair of the pull cords 71, 71 has an advanced state when the pull cords are pulled and a retracted state when the pull cords are not pulled. The pull cords 71, 71 are pulled by a handle 69. Pulling the handle 69 loosens the joint connection allowing the pushing section 4 to be folded. As shown in FIG. 8B, the pull cords 71, 71 are in a retracted state and as shown in FIG. 8C, the pull cords 71, 71 are in an advanced state when the handle 69 is pulled.

Figure 8D:
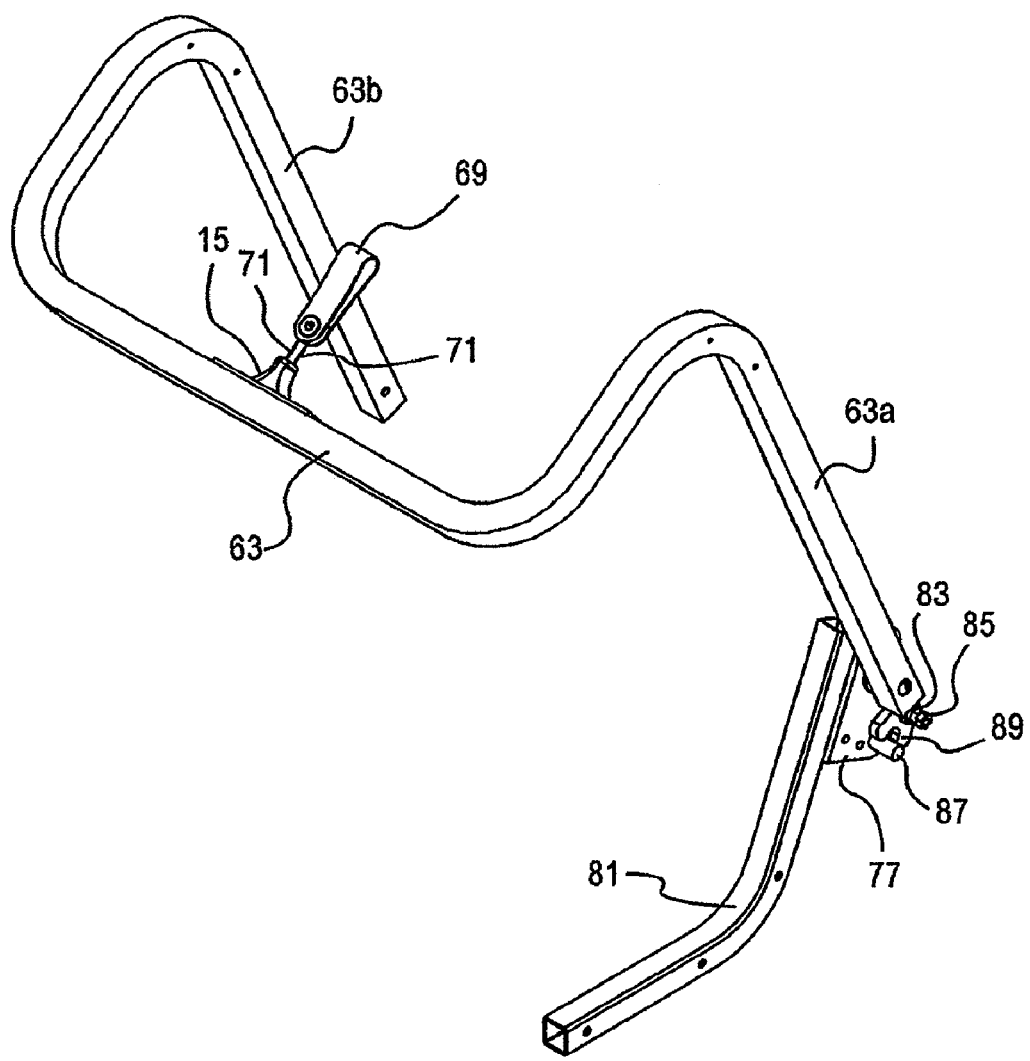
Figure 8E:
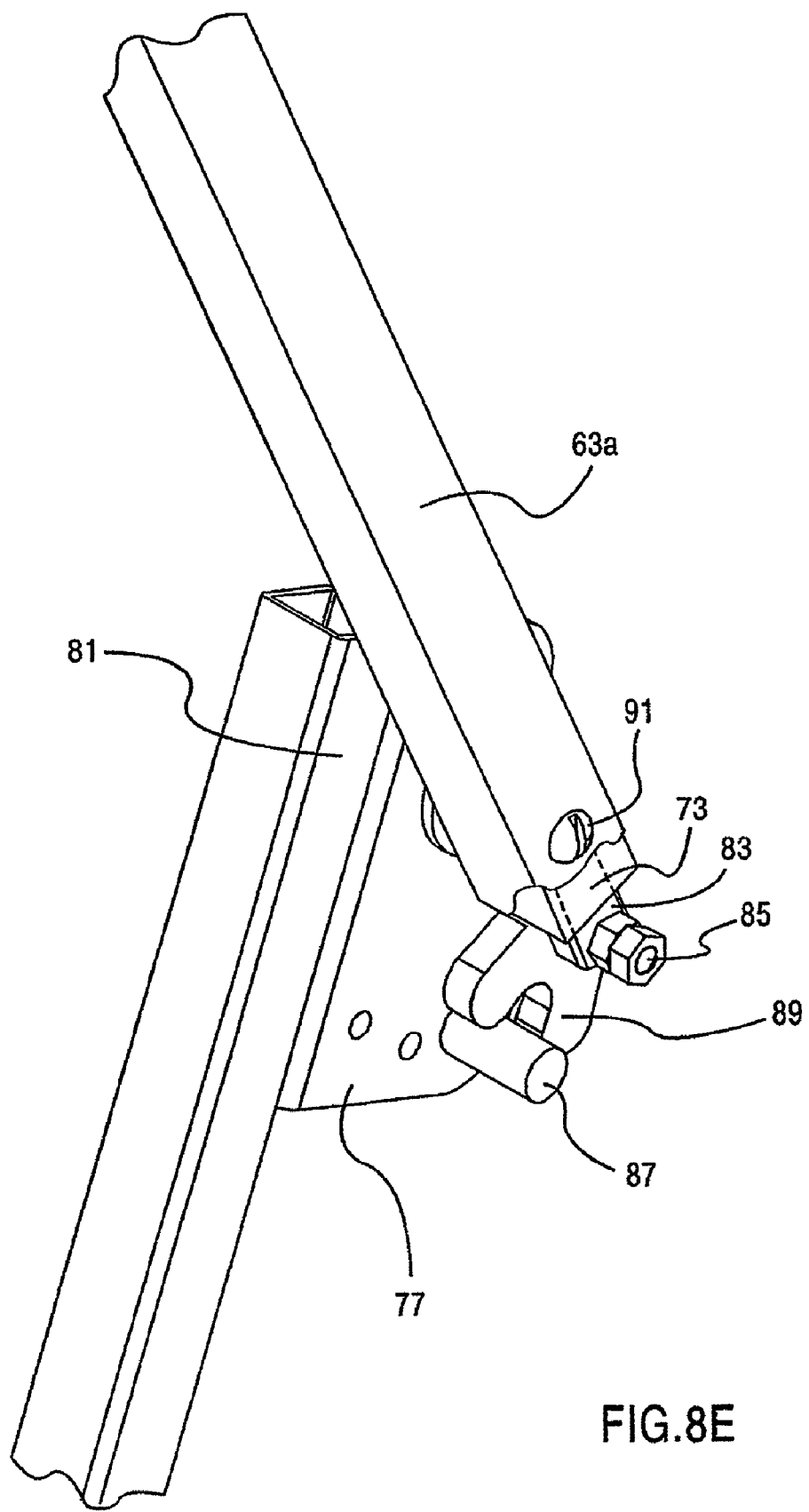

As shown in FIG. 8B, a pivot sleeve 73 is fixed within the arms 63a and 63b of the back frame 63. The pivot sleeve 73 provides a backing surface for the spring 75 to press against the pivot pin 83. The pivot pin 83 is concentrically disposed within the pivot sleeve 73 and is adapted to slide a limited distance upward therein when the pull cords 71, 71 are in the advanced state. In FIGS. 8B and 8C, the connecting portion of the pivot pin 83 is removed for clarity; however, as shown in FIGS. 8D and 8E, the pivot pin 83 is connected to the fold latch 89 and rotates thereon through the latch pin 85. The pivot pin 83 has a slot for receiving a pivot axle bolt 91. The pivot axle bolt 91 is fixed to and extends perpendicularly from the fold bracket 77 so that the back frame 63 through the pivot pin 83 can rotate.

A fold latch 89 is rotatably supported on and semi-circumscribes a latch post 87 and is held in a first position by a radial force applied by the pivot pin 83. The fold latch 89 is adapted to move to a second position when the radial force applied by the pivot pin 83 is removed during an advanced state of the pull cords 71, 71, as shown in FIGS. 8C and 8D.

A biasing member 75, such as a coil spring, urges or otherwise biases the pivot pin 83 into engagement with the fold latch 89 in the retracted state of the pull cords 71, 71.

The folding mechanism also includes a fold bracket 77 for connecting the fold strut 81 to the back frame 63. In operation the back frame 63 pivots along the fold bracket 77 with respect to the fold strut 81. A fold washer or fold spacer 79 is disposed between the back frame 63 and the fold bracket 77 to prevent wear of the back frame 63. A latch pin 85 mounts the fold latch 89 to the pivot pin 83 and a fold pivot axle bolt 91 mounts the back frame 63 to the fold bracket 77.

When the pivot pin 83 is in a retracted state, the fold latch 89 is locked in place against the latch post 87 and does not rotate. The position of the fold latch 89 therefore prevents the pushing section 4 from folding forward.

In operation, when the user pulls the handle 69, the handle pulls the pull cords 71, 71, causing the pivot pin 83 to move upward. When the pivot pin 83 moves upward, the pivot pin allows the fold latch 89 to begin to rotate around the latch pin 85 and removes the fold latch from being in a first position locked against latch post 87. As such, the fold latch 89 is able to rotate freely about the latch pin 85. By allowing the fold latch 89 to rotate freely, the fold latch 89 also is released from the latch post 87. The handle 69 can continue to be pulled to a maximum predetermined amount so that the fold latch 89 is able to rotate freely around latch post 87 and the back frame 63 can pivot to a position with respect to the fold strut 81.

Figure 9:
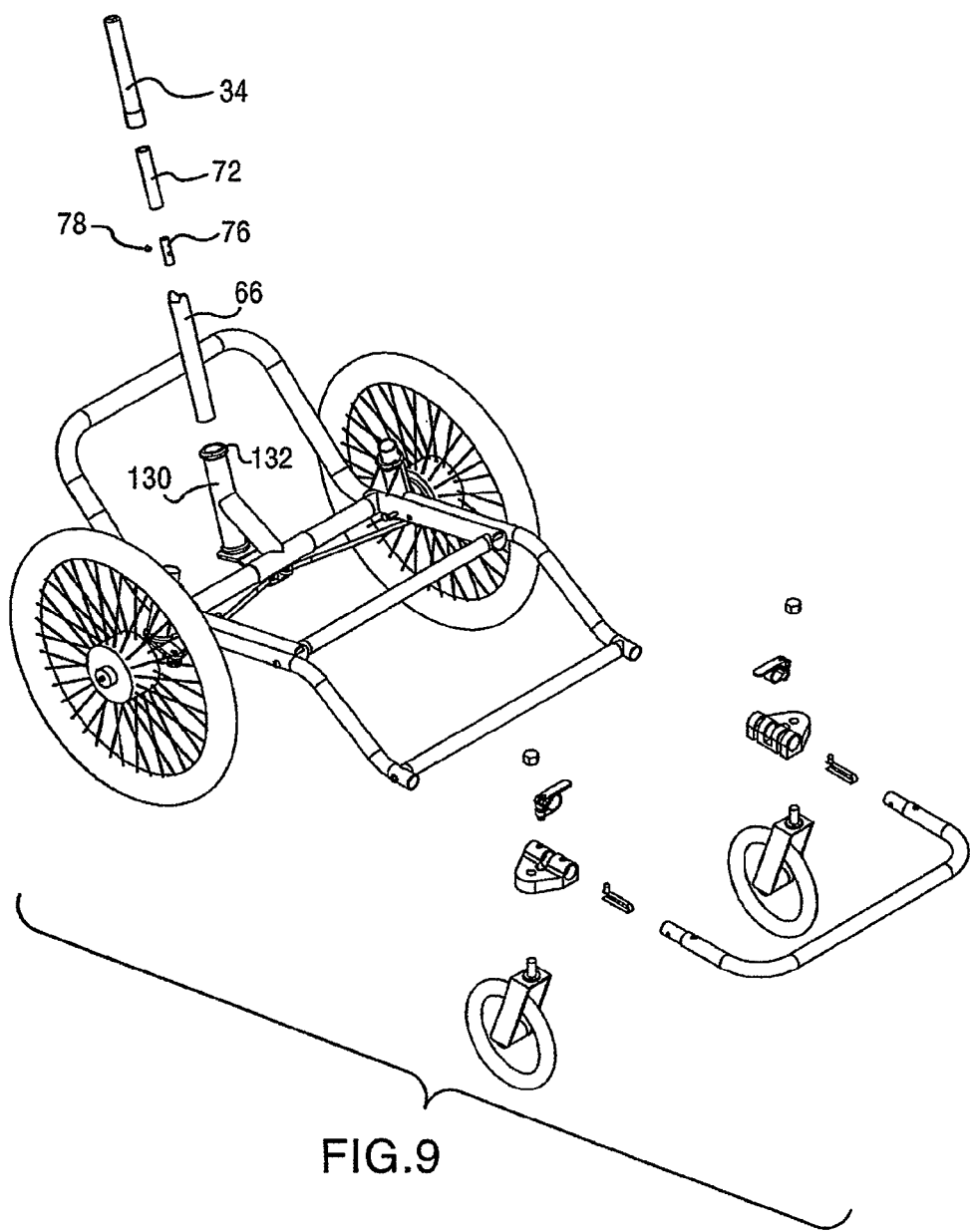
FIG. 9 illustrates an exploded view of the pushing section.

FIG. 9 illustrates an exploded view of the pushing section 4 showing the components of the braking and steering assembly thereof. The components include a cable slide sleeve 72, which is slidably inserted into the lower connection post 34. A cable slide 76 is slidably inserted into the cable slide sleeve 72. A braking cable 86 that controls the braking of the wheels 12 of the pushing section 4 is fixed in one end of the cable slide 76. The lower connection post 34, cable slide sleeve 72 and cable slide 76 are concentrically and rotatably arranged within a pushing section steerer tube 66. The lower connection post 34 can transmit a braking force from the riding section 6 to the pushing section 4. The pushing section steerer tube 66 transmits the turning motion from the handlebars 40 to the pushing section 4. One end of the lower connection post 34 is disposed in the pushing section steerer tube 66 and the other end of the lower connection post 34 is disposed within a fork-steerer tube 36 of the riding section. The pushing section steerer tube 66 rotates within a cylindrical headset pivot 130 and fixed to the headset pivot by a threaded headset 132 provided at opposite ends thereof.

Figure 10:
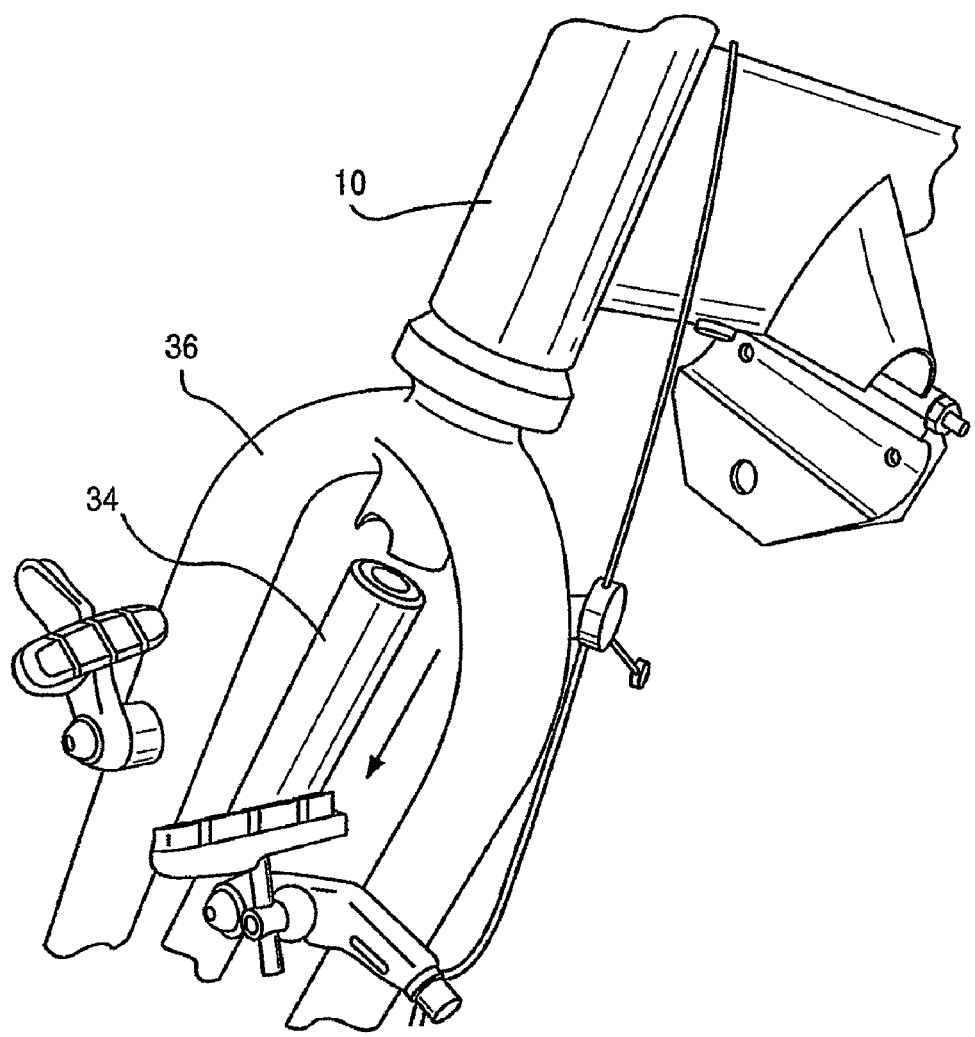
FIG. 10 illustrates alignment of the steering assemblies of the pushing and riding sections.
Figure 11:
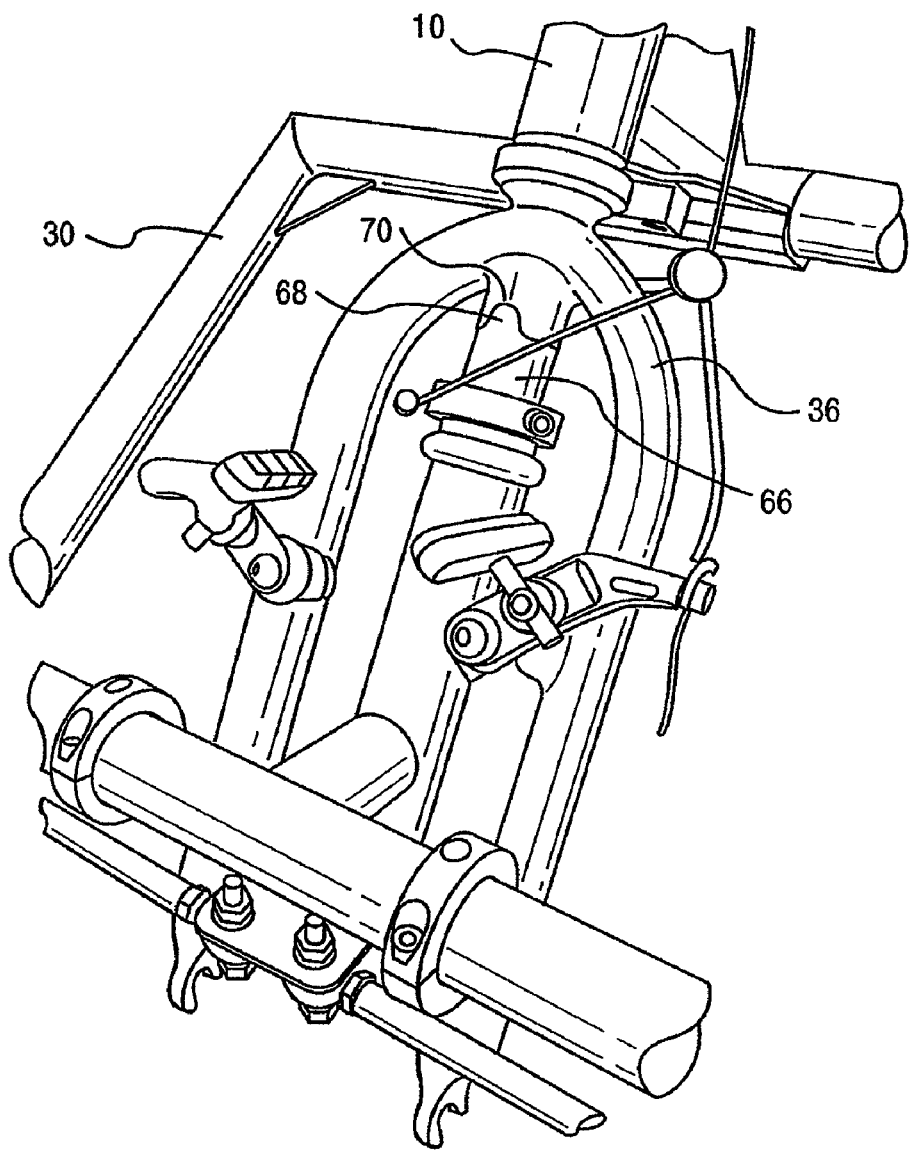
FIG. 11 illustrates the connection between the steering assemblies of the pushing and riding sections.

FIG. 10 illustrates the alignment and slidable insertion of the lower connection post 34 of the pushing section 4 into the hollow fork-steerer tube 36. The hollow fork-steerer tube 36 connects the steering of the pushing section 4 with the steering of the riding section 6. In the head tube 10, the upper connection post of the riding section is connected with the lower connection post 34 of the pushing section. FIG. 11 shows the lower end of the head tube 10 in which the lower connection post is rotatably inserted within the pushing section steerer tube 66. The pushing section steerer tube 66 includes a tab 68 on an upper edge for engaging a notch 70 on the fork-steerer tube 36 of the head tube 10, so that the steerer tube 66 moves with the head tube 10.

The braking components of the pushing section 4 and the riding section 6 of the vehicle frame are combined in the head tube 10 of the riding section so that the braking operation of the pushing section is controlled by the braking lever 42 of the riding section 6.

Figure 12A:
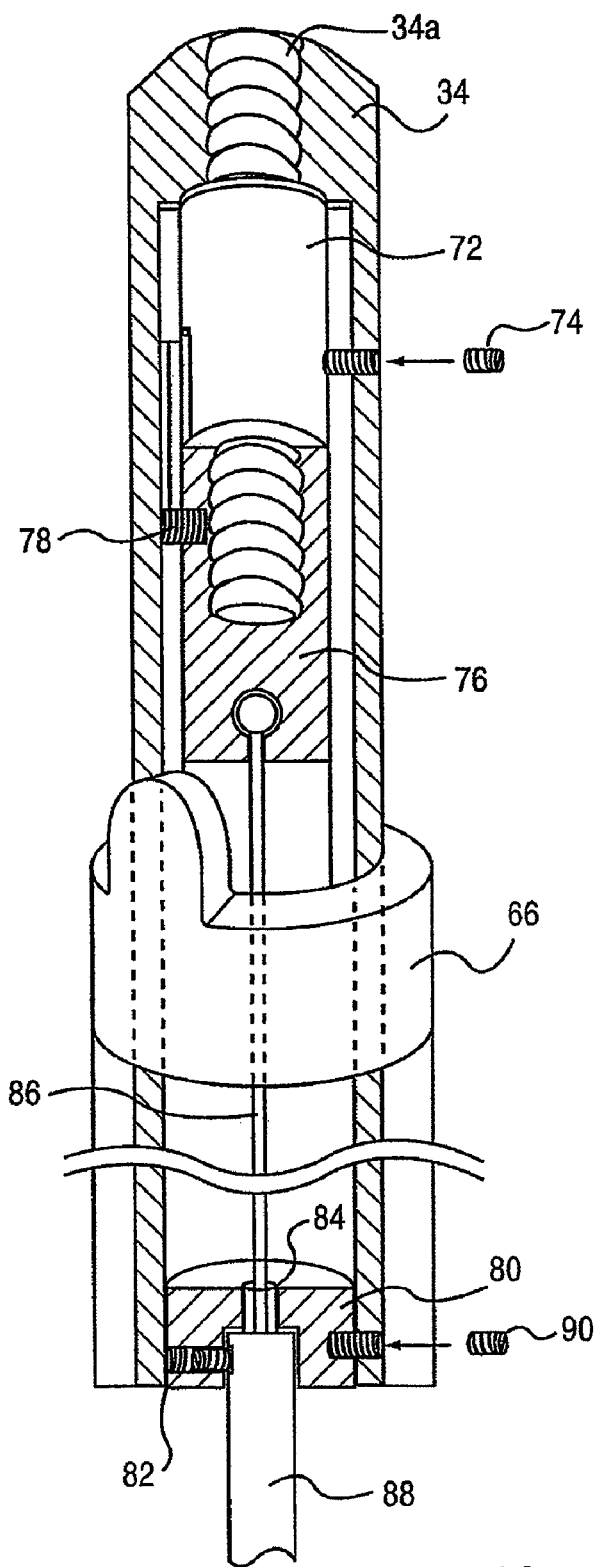
Figure 12B:
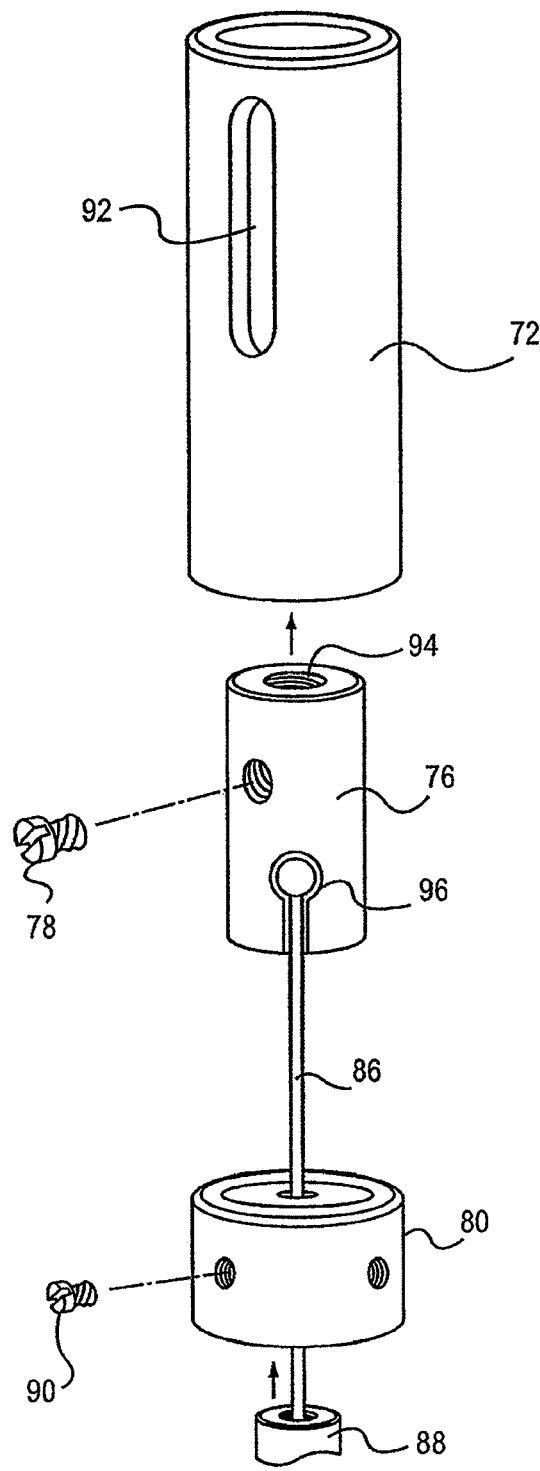

Referring to FIGS. 12A-15G, the braking and steering assembly in the stroller-cycle will now be described. As illustrated in FIGS. 12A and 12C, the braking and steering components of the pushing section are disposed within the lower connection post 34. The lower connection post 34 includes a cable slide sleeve 72 concentrically fixed therein by a fixing member 74. The fixing member 74 can be laterally inserted into the side of the cable slide sleeve 72 through the lower connection post 34 to prevent the cable slide sleeve 72 from rotating with respect to the lower connection post 34. A cable slide 76 is slidably inserted into the cable slide sleeve 72. The cable slide 76 has a fixing member 78 laterally inserted into a side thereof by threading or press-fitting to prevent the cable slide 76 from rotating with respect to the cable slide sleeve 72. A cable plug 80 is inserted into the bottom of the lower connection post 34 to close a circumferential opening 82 therein. The cable plug 80 has a longitudinal guide hole 84 for centering a second control cable, such as a front brake cable from the pushing section 4 in the lower connection post 34 and securing an end of a cable housing 88 encasing the second front brake cable. Similar to the cable slide sleeve 72 and the cable slide 76, the cable plug 80 can have a fixing member 90 laterally inserted into a side thereof and through a side of the lower connection post 34 to prevent the cable plug from rotating with respect to the lower connection post 34. A slot 92 is provided in the cable slide sleeve 72 to prevent the cable slide 76 from rotating concentrically in the cable slide sleeve 72.

The cable slide sleeve 72 has an inner surface for concentrically guiding the cable slide 76. The cable slide 76 also has a threaded opening 94 in an upper end and a notched opening 96 in a lower end. The threaded opening 94 in the upper end of the cable slide 76 receives a lower threaded end 106*b* of a cable rod 106 from the upper connection post 104, shown in FIG. 15A and discussed in further detail below. The notched opening 96 in the lower end of the cable slide 76 receives and retains a terminal end 98 of the second front brake cable 86 for controlling the braking of the front wheels 12 of the pushing section 4.

Figure 13A:
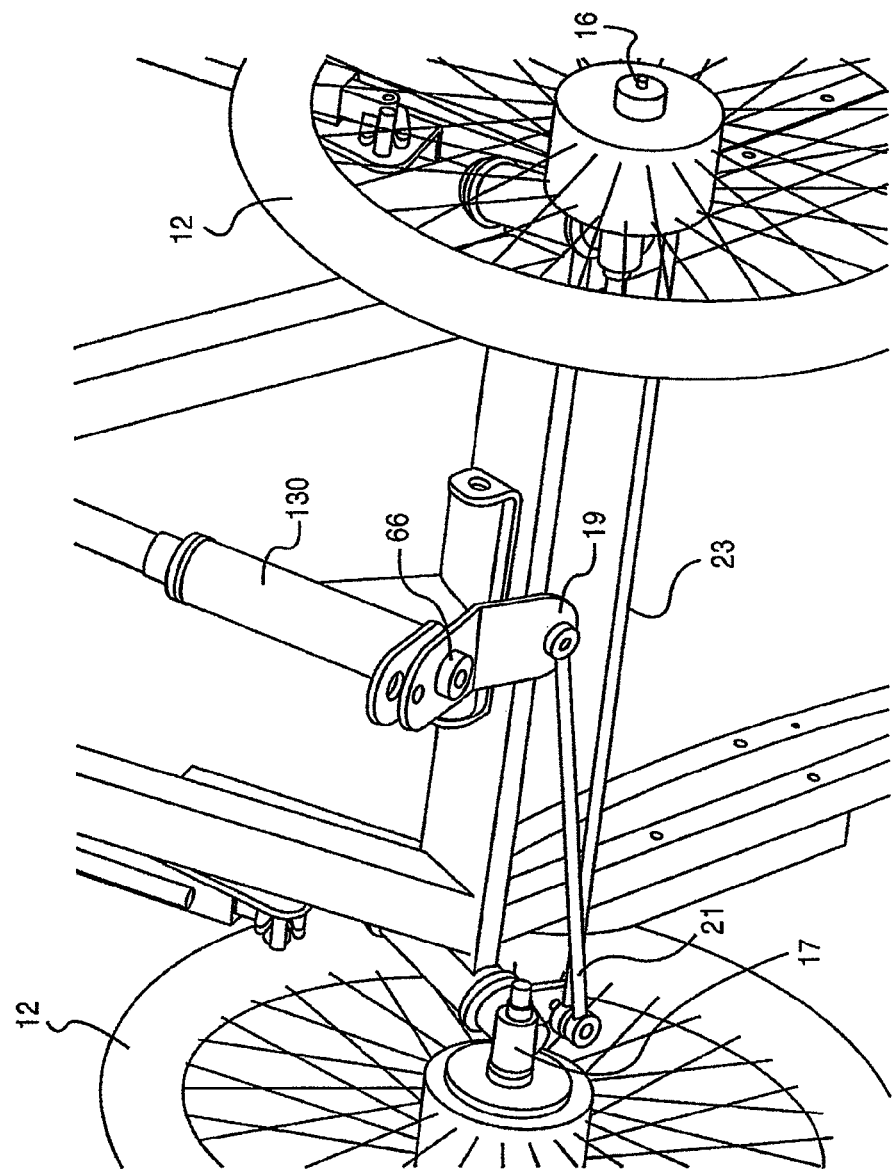
FIGS. 13A to 13C illustrate the steering mechanisms of the pushing section from below.
Figure 13B:
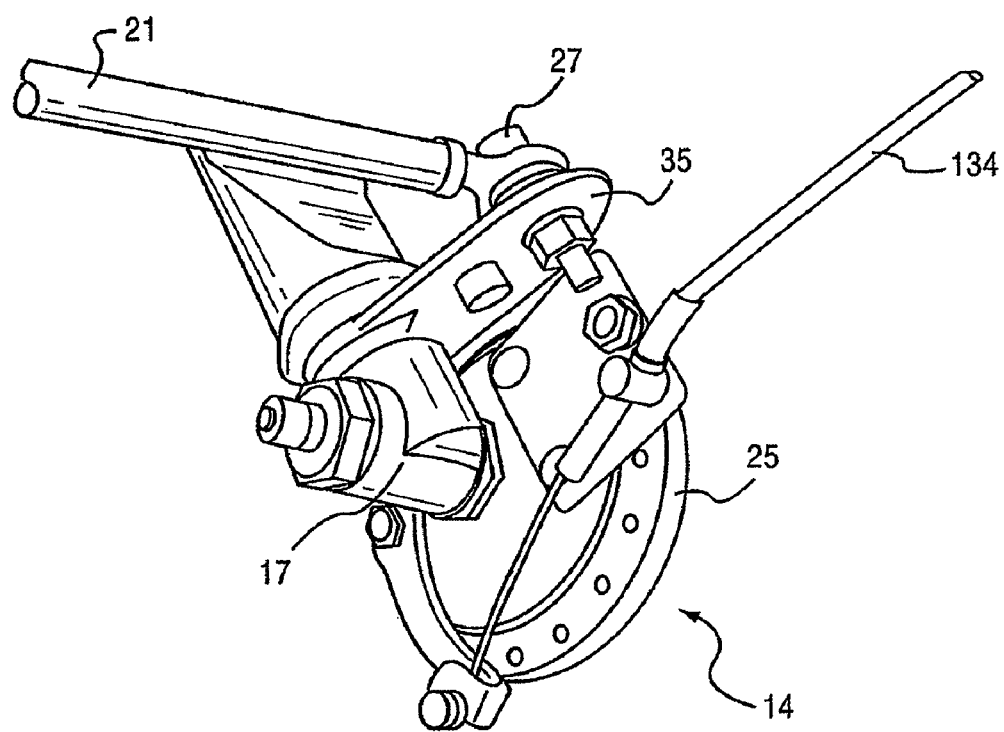
Figure 13C:
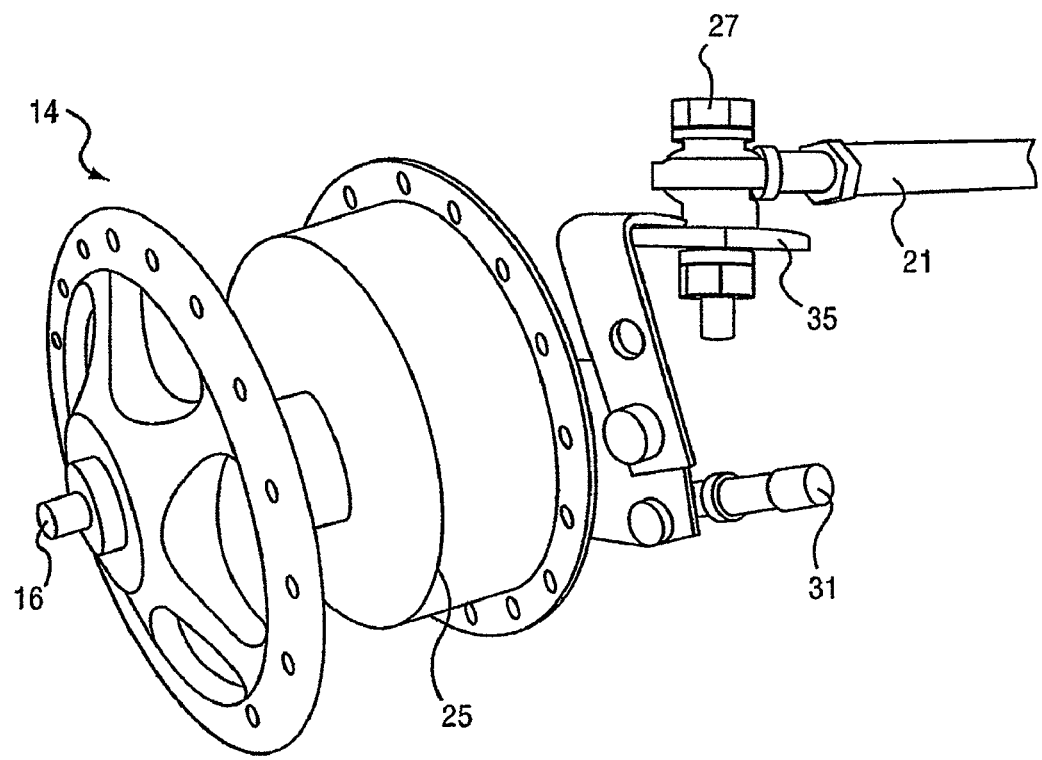

FIGS. 13A to 13C illustrate a brake 14 of the pushing section 4 and the steering operation of the pushing section 4 as controlled from the riding section 6. The schematic drawing of FIG. 13A illustrates the components of the steering section. The steering operation of the pushing section 4 is achieved by translating the rotational movement of the lower connection post 34, which is connected to the upper connection post in the riding section 6, into the linear movement of first tie rod 21 and second tie rod 23. The lower connection post 34 is disposed within the cylindrical headset pivot 130. The first tie rod 21 is bolted to the pushing section steerer tube 66 through a plate 19 mounted at the end of the steerer tube extending through the bottom of the cylindrical headset pivot 130. The pushing section steerer tube 66 is rigidly attached to the cylindrical headset pivot 130 by threaded headsets 132. The pushing section steerer tube 66 thus rotates with the rotation of the lower connection post 34, which is connected to the upper connection post 104 within the head tube 10. The pushing section steerer tube 66 is connected to the plate 19 to which one end of the first tie rod 21 is bolted. The other end of the first tie rod 21 is bolted at the wheel steering pivot 17. The second tie rod 23 is also bolted at one end to the wheel steering pivot 17 at the hub of one wheel 12 and connected at the other end to the hub of the other wheel 12. Bolts through the end of the tie rods 21 and 23 hold the tie rods to the steering bracket. As such, the tie rod 21 is connected through a wheel steering pivot 17 on the wheel 12 to transmit steering from the riding section 6 to the front wheels 12 of the pushing section 4. FIG. 13B shows the tie rod 21 connected through a bolt 27 and plate 35 to the wheel steering pivot 17. The plate 35 is connected to the wheel steering pivot 17. The sliding movement of the tie rod 21 causes the plate 35 to pivot on the bolt 27. The pivoting movement of the plate 35 on the wheel steering pivot 17 causes the wheel 12 to move in the direction of the tie rod 21. As a result, the wheel 12 of the pushing section 4 turns under the control of the riding section 6.

In FIGS. 13B and 13C, the parking braking assembly 14 of the pushing section 4 includes a brake 25, such as, for example, a drum brake. A parking brake cable 134 of the pushing section 4, when controlled by the operator, maintains the pushing section in a stationary position by applying a force to the brake 25. Also shown in FIG. 13C is a quick release mechanism 16 for quickly and easily removing the wheel 12.

Figure 14:
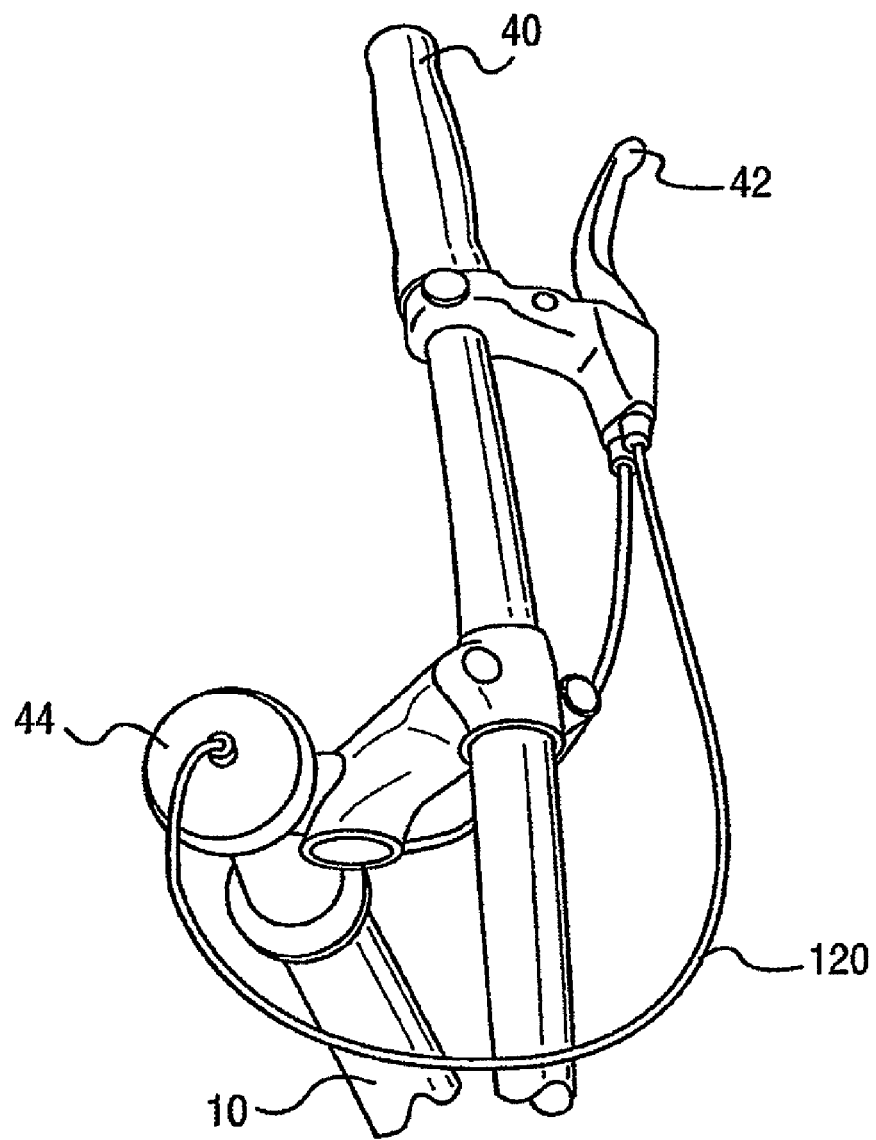
FIG. 14 illustrates a top perspective view of the front knob and stem.

FIG. 14 illustrates a top view of a front connection knob 44 receiving a first front brake cable 120.

As shown in FIG. 14, the braking and steering assembly in the stroller-cycle 2 includes a brake lever 42 in the riding section on, for example, the handlebar 40, to control the first front brake cable 120.

Figure 15A:
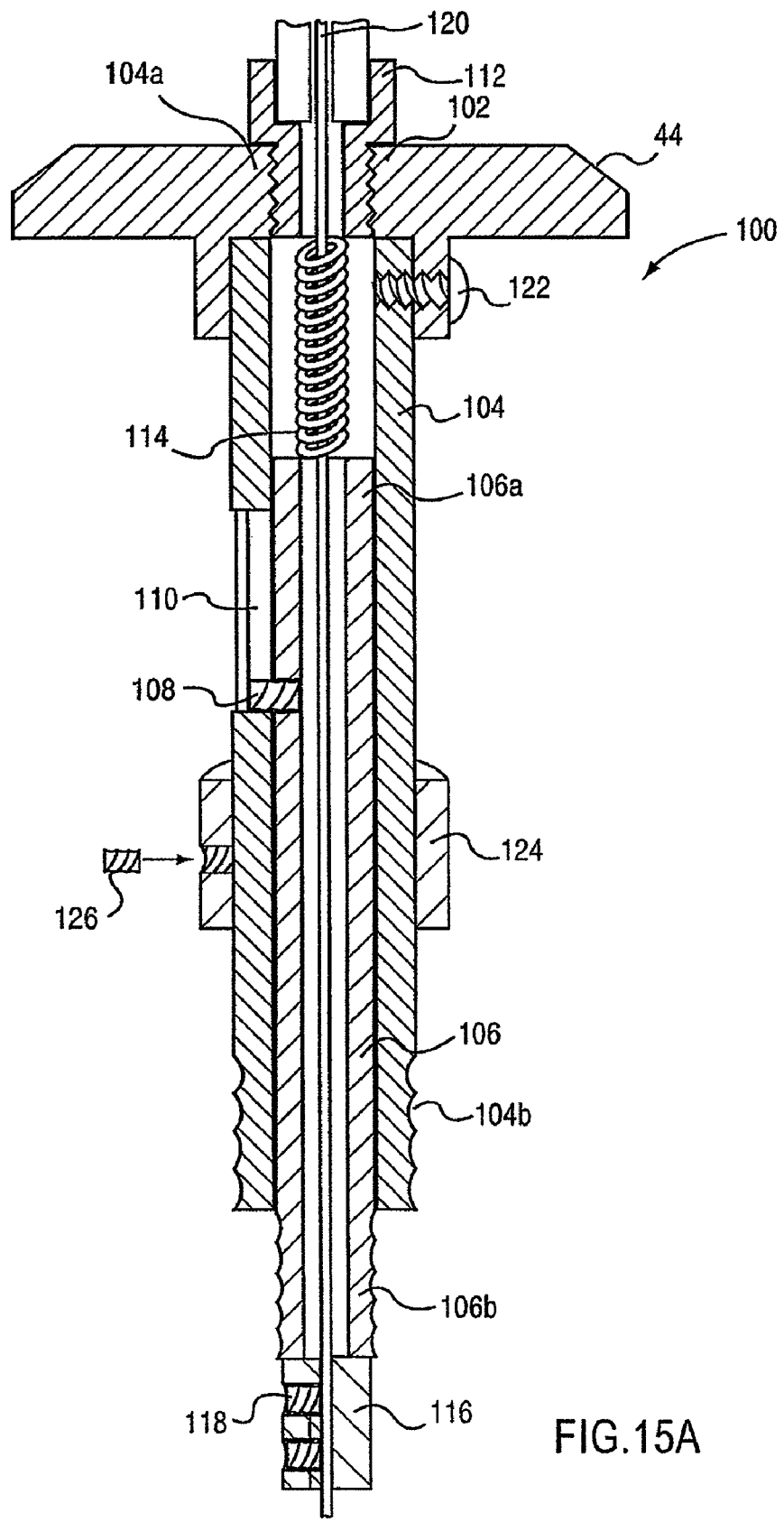
FIGS. 15A to 15G illustrate the braking and steering assembly of the riding section.
Figure 15B:
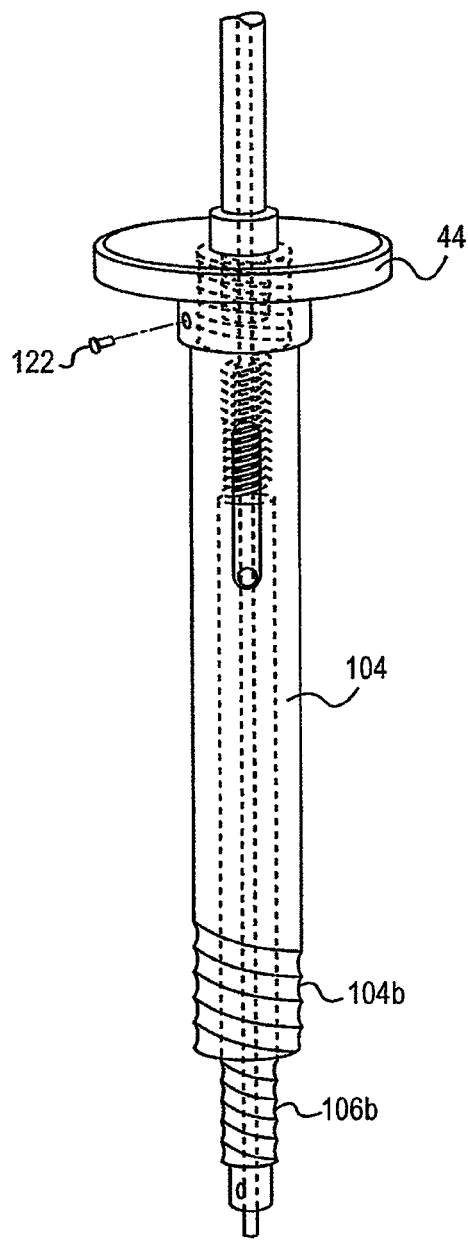
Figure 15C:
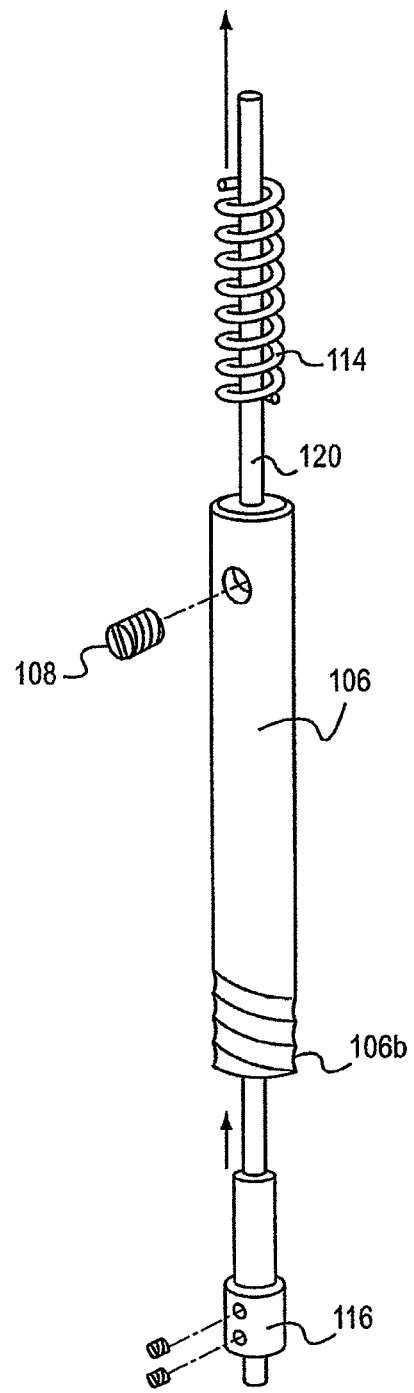
Figure 15D:
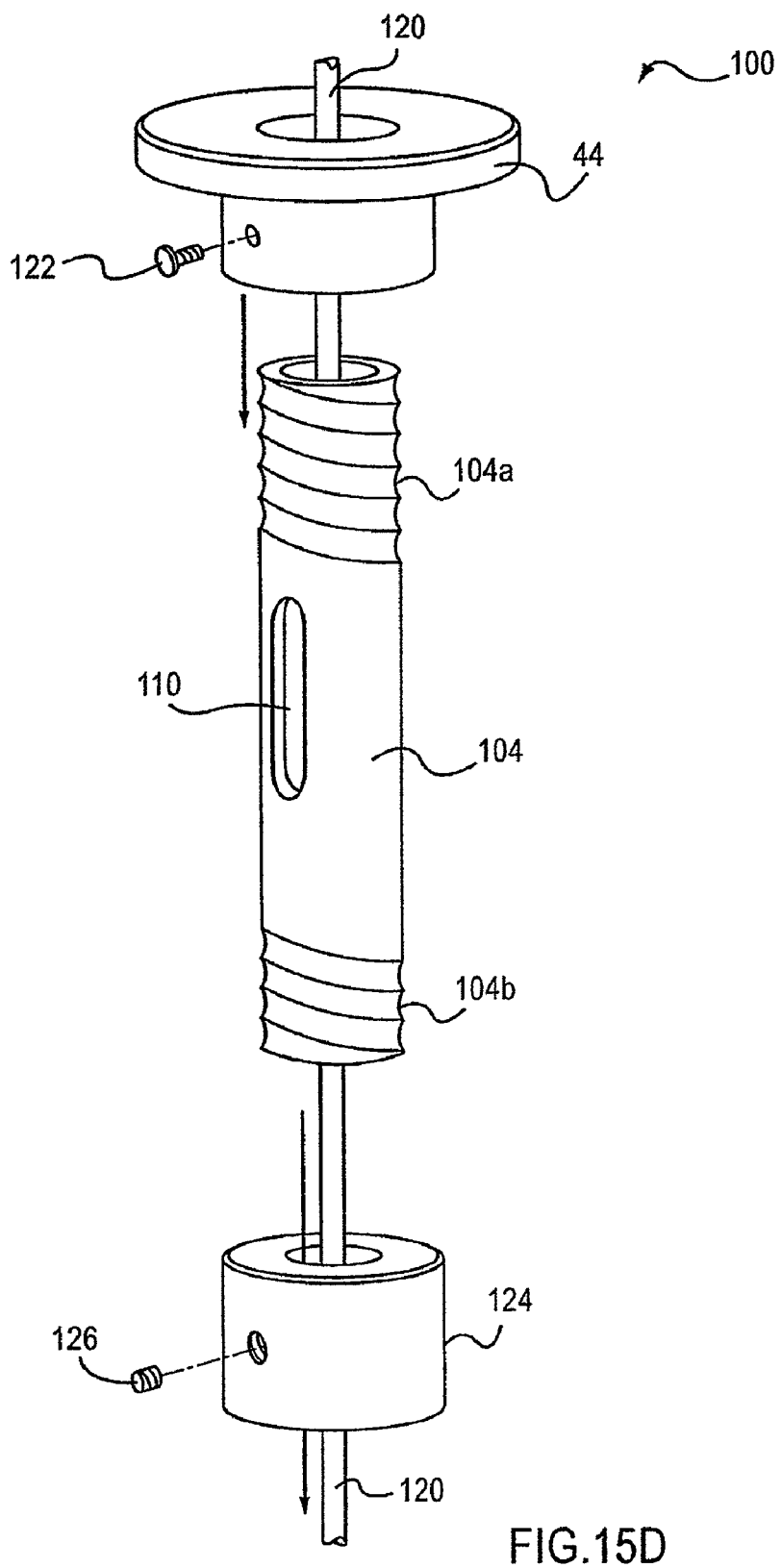
Figure 15E:
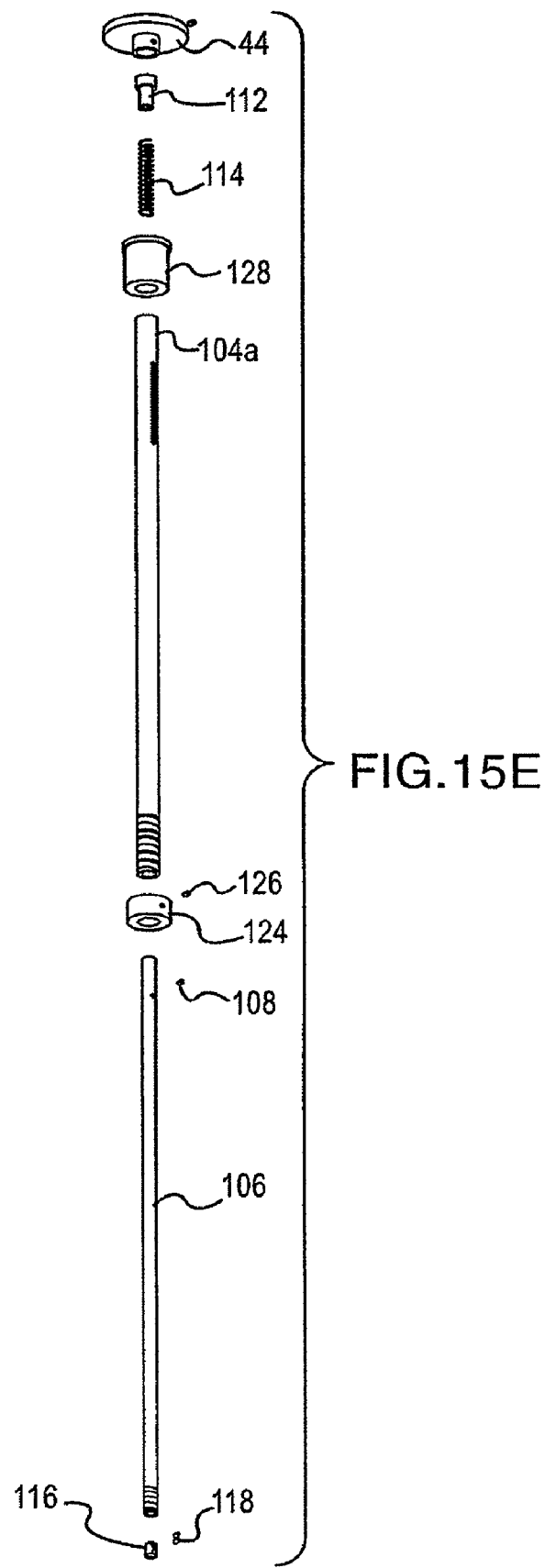
Figure 15F:
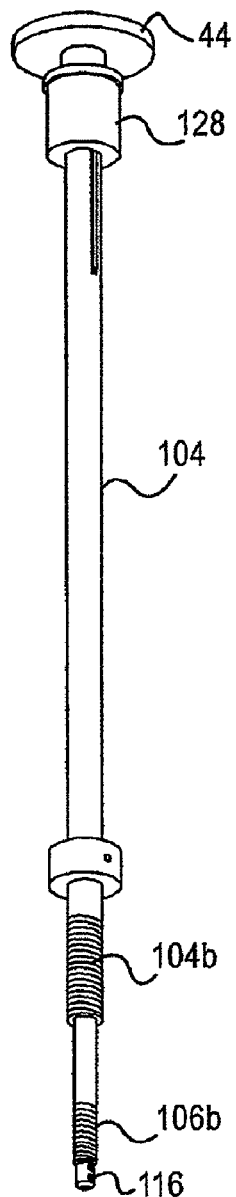
Figure 15G:
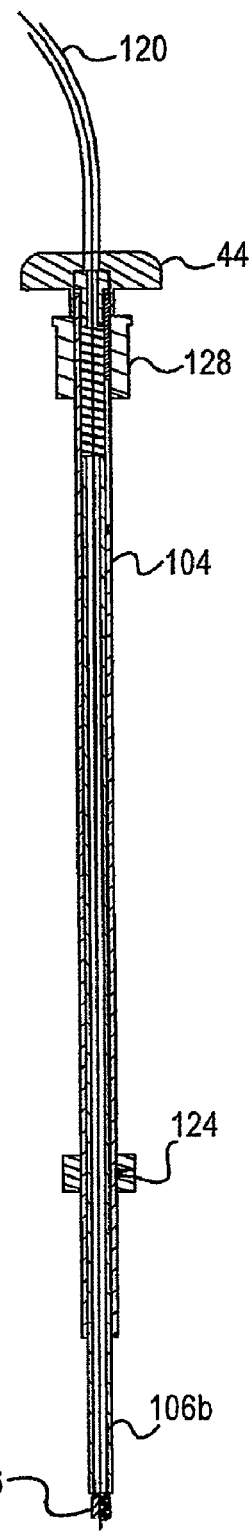

The braking and steering assembly components 100 disposed in the head tube 10 and stem 38 of the riding section 6 will now be described with reference to FIGS. 15A to 15G. The rotatable front connection knob 44 is disposed at the top of the stem of the riding section 6, as shown in FIG. 15A, and has a central aperture 102 in which an upper portion thereof is threaded and a lower portion is unthreaded. The upper connection post 104 has an upper end 104*a* that is inserted and fixed in the lower portion of the central aperture 102 of the front connection knob 44, as shown in FIG. 15A. The upper connection post 104 also has a lower threaded end 104*b* that is received in the top or upper threaded end 34*a* of the lower connection post 34 so as to secure together the upper and lower connection posts 104 and 34, respectively. The axes of the upper and lower connection posts 104 and 34 are aligned. As described above, the lower connection post 34 has a cable slide 76 therein that slides vertically within a fixed cable slide sleeve 72. The cable slide 76 has a threaded aperture 94 at an upper end for receiving one end 106*b* of a cable rod 106 disposed within the upper connection post 104. The cable rod 106 has a first end 106*a* slidably disposed within the upper connection post 104 and the second end 106*b* of the cable rod is threadedly connected within the threaded aperture 94 of the cable slide 76 in the lower connection post 34. A cable rod fixing member 108 is laterally inserted into the side of the cable rod 106. A slot 110 in one side of the upper connection post 104 receives a cable rod fixing member 108 to prevent the cable rod 106 from rotating within the upper connection post 104. The cable rod fixing member 108 can be laterally inserted into the cable rod 106 by press-fitting, threading or other fixing method.

A cable adjuster 112 is also disposed within the upper portion of the central aperture 102 of the rotatable front connection knob 44, and is threadedly connected to an inner surface thereof. A coil spring 114 is arranged between the cable rod 106 and the cable adjuster 112. The coil spring 114 is in a compressed state and continually applies a downward pressure on the cable rod 106 so that the cable rod is disposed in the correct position for being threaded into the cable slide 76 when the pushing section 4 and riding section 6 are joined.

A cable stop 116 is disposed at an end of the cable rod 106 for clamping a terminal end of the first front brake cable 120. Clamping in the cable stop 116 is achieved by cable stop fixing members 118.

The upper connection post 104 guides therethrough the first front brake cable 120 that extends from the brake lever 42 through the cable adjuster 112, the coil spring 114 and the cable rod 106 and terminates at the cable stop 116. Fixing members 118 hold the first front brake cable 120 firmly in the cable stop 116. The lower connection post 34 guides therethrough the second front brake cable 86. The second front brake cable 86 extends from the front wheels 12 of the vehicle and terminates in the cable slide 76. The second front brake cable 86 also passes through a splicing assembly as will be described below.

The front connection knob 44 rotates in clockwise and counterclockwise directions. In one of the rotation directions, the front connection knob 44 connects the upper connection post 104 in the riding section 6 with the lower connection post 34 in the pushing section 4 so that braking and steering in the riding section controls the braking and steering in the pushing section. In the opposite rotation direction, the front connection knob 44 disconnects the upper connection post 104 from the lower connection post 34. A front rotation knob fixing member 122 is inserted into a side portion of the front connection knob 44 and through the upper connection post 104 to secure the front connection knob 44 and the upper connection post 104 together and prevent the upper connection post from rotating relative to the front connection knob 44.

A spacer 124, as shown in FIGS. 15A and 15D to 15F, disposal between an outer surface of the upper connection post 104 and the inner surface of the head tube 10 centers the upper connection post 104 within the head tube 10. A spacer fixing member 126 holds the spacer 124 on the upper connection post.

Figure 16A:
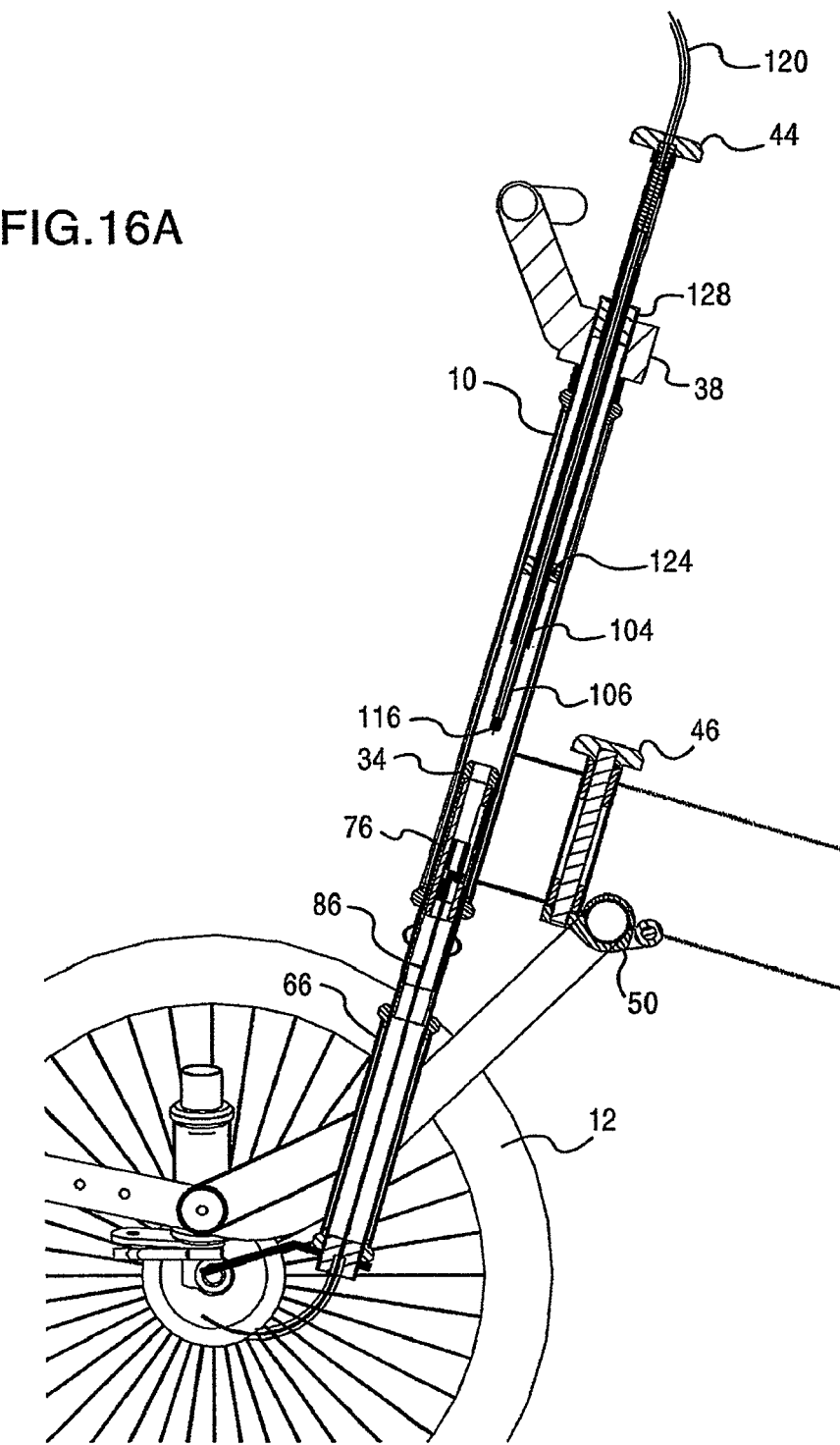
FIGS. 16A to 16C illustrate the braking and steering assemblies of the pushing and riding sections.
Figure 16B:
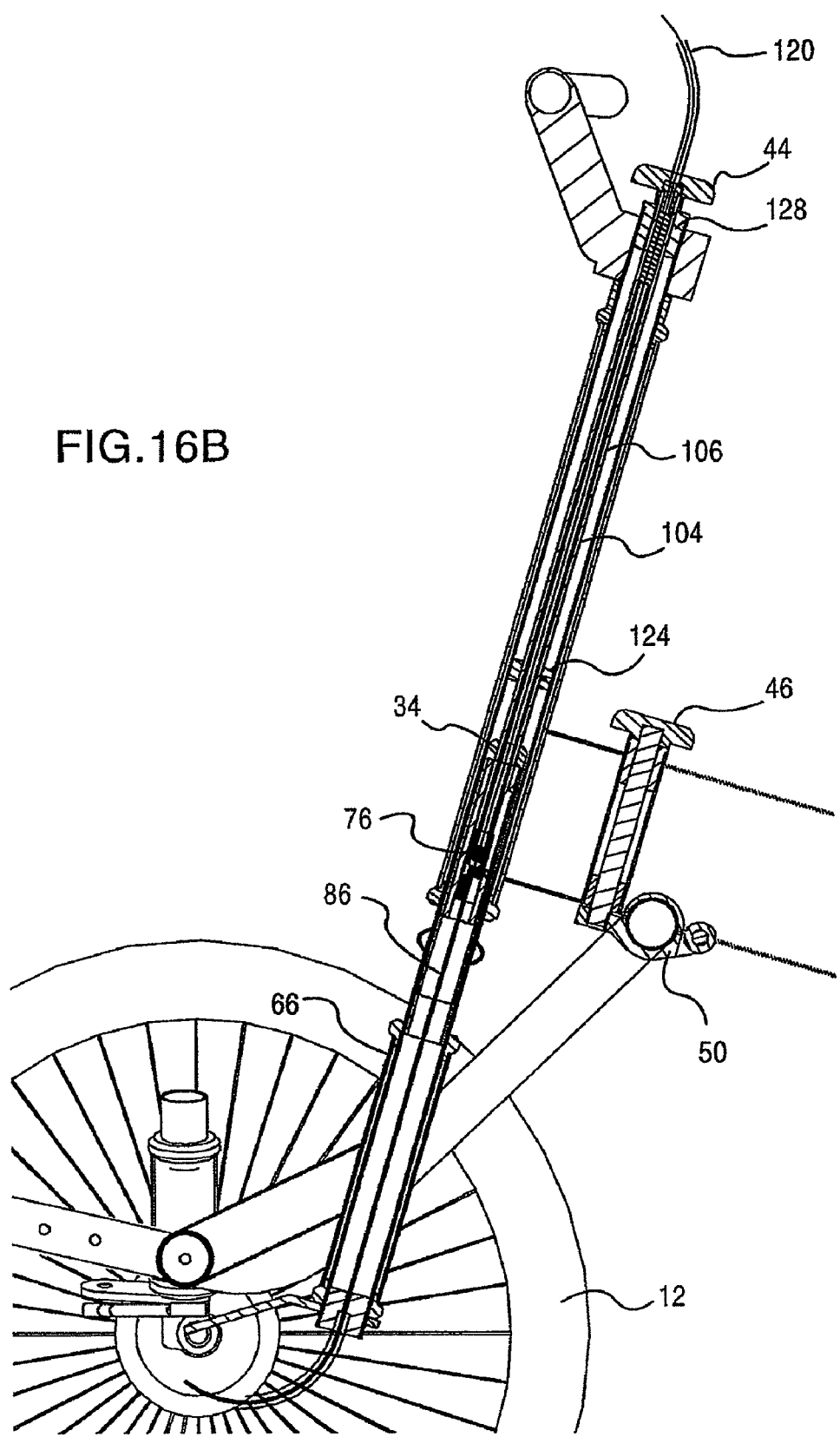
Figure 16C:
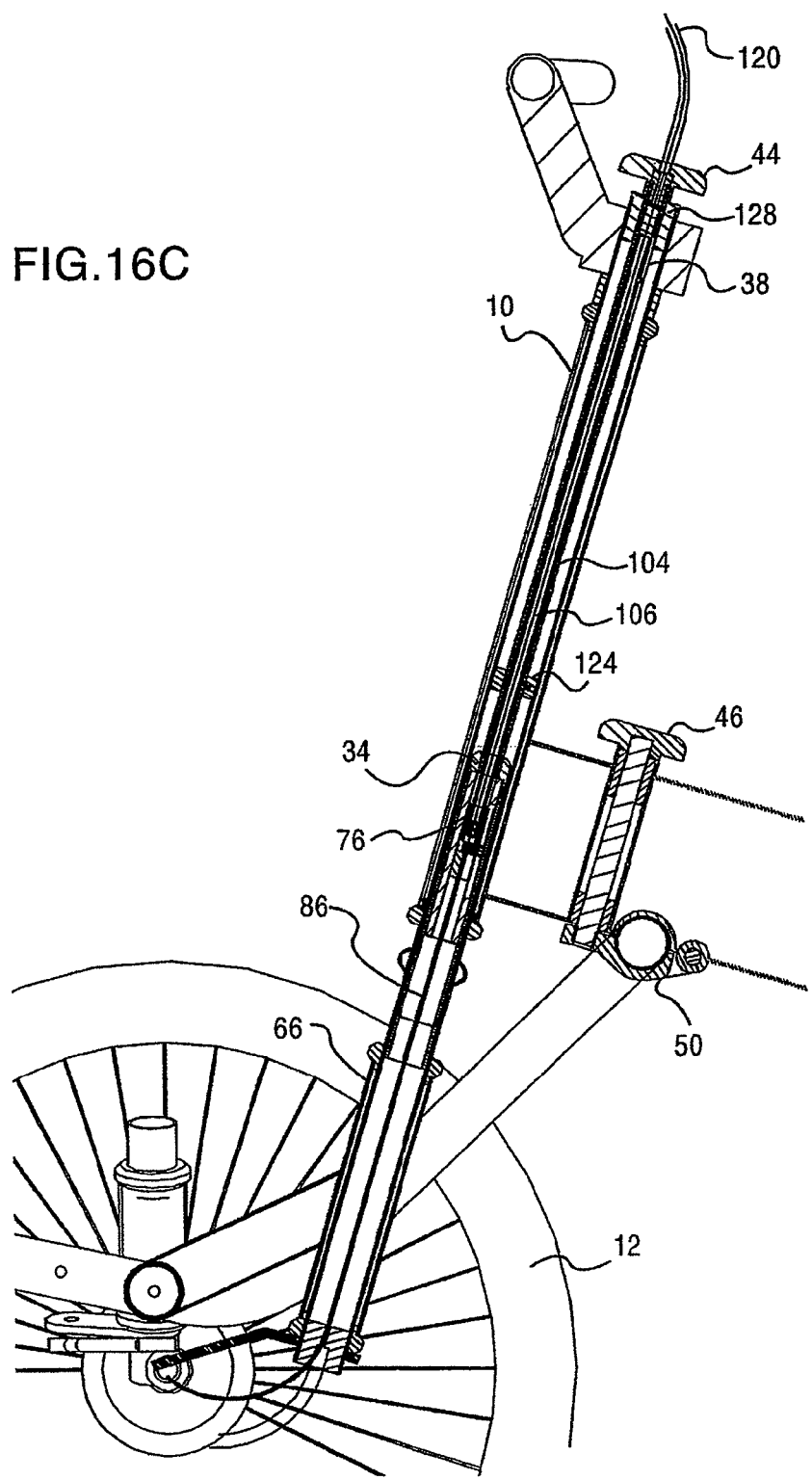

FIGS. 16A to 16C illustrate the braking and steering assemblies of the pushing and riding sections.

The disconnected state of the braking and steering assembly is shown in FIG. 16A. As shown in FIG. 16A, before connection of the upper and lower connection posts 104 and 34, the cable rod 106 in the upper connection post 104 hovers over the threaded opening of the lower connection post 34. The front connection knob 44 is shown in an extended state from the retainer 128 in the stem 38. The retainer 128 retains the front connection knob 44 and the braking and steering components of the riding section in the head tube 10. The downward movement of the front connection knob 44 causes the cable rod 106 to enter the lower connection post 34 and then be threaded within the cable slide 76.

The connected and operating states of the braking and steering assembly are shown in FIGS. 16B and 16C, respectively. In the connected state, when the braking lever is not pulled, as shown in FIG. 16B, the cable rod 106 is in a neutral state and the cable slide 76 is at a lower portion of the lower connection post 34. FIG. 16C illustrates an operating state wherein the brakes of the front wheels 12 of the pushing section are controlled from the riding section 6 as follows. When the brake lever 42 on the riding section is squeezed, the cable rod 106 threaded into the cable slide 76 moves upwardly toward the front connection knob 44. The threaded end of the cable rod 106, which is threadedly engaged in the upper end of the cable slide 76, draws the cable slide in the lower connection post 34 upwardly in a direction toward the front connection knob 44. As a result, the terminal end of the second front brake cable 86 is drawn upwardly, which generates a corresponding braking action on the front wheels 12.

The cable splicing assembly 136 for transmitting a braking force from the front brake of the riding section 6 and the parking brake of the pushing section 4 to the front wheels of the pushing section will now be described. The cable splicing assembly 136 transmits the braking force of the front brake of the riding section 6 and the steering of the riding section 6 to one of the front wheels 12 of the pushing section 4. The cable splicing assembly 136 also transmits the braking force from the parking brake of the pushing section 4 to the other front wheel 12 of the pushing section 4. The braking forces are transmitted by cables controlled by the front brake lever on the handlebars 40, 40 of the riding section 6 and from the parking brake of the pushing section 4.

Figure 17:
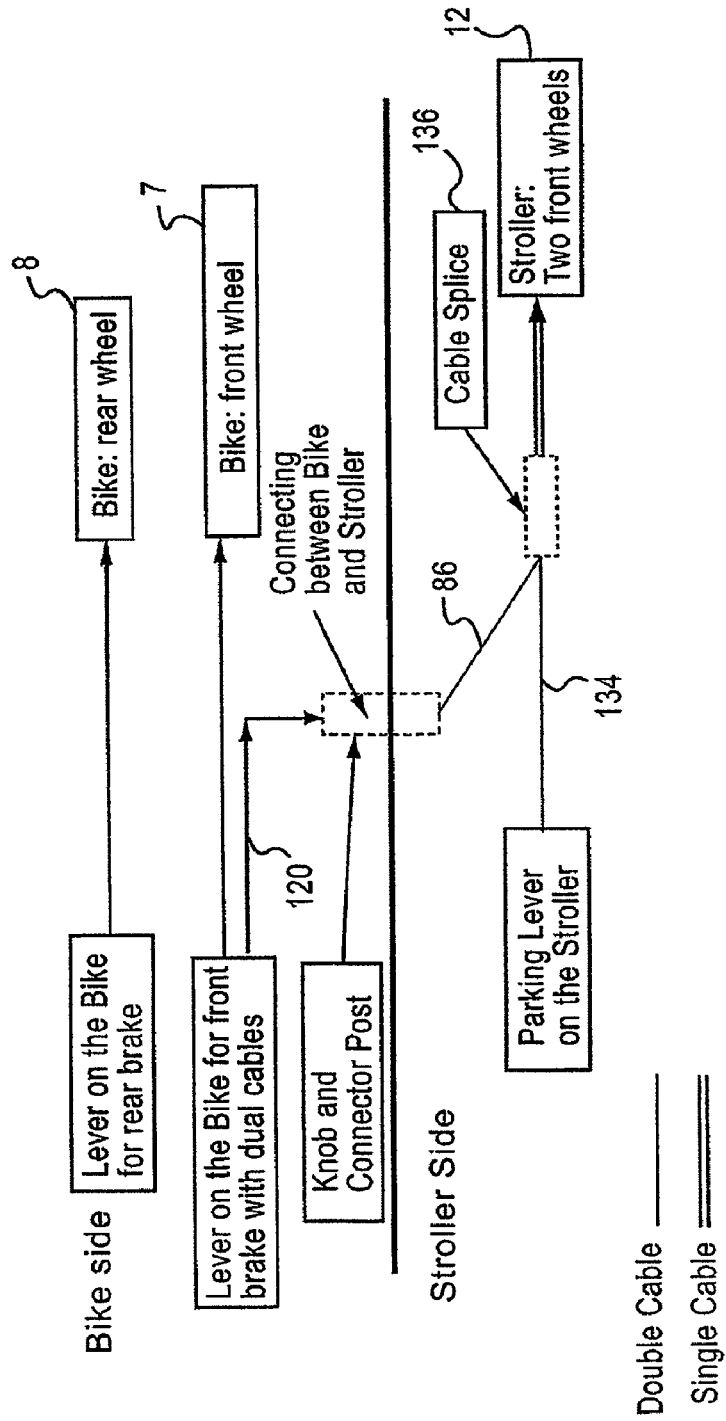
FIG. 17 illustrates a schematic diagram of the cable splicing assembly.
Figure 19A:
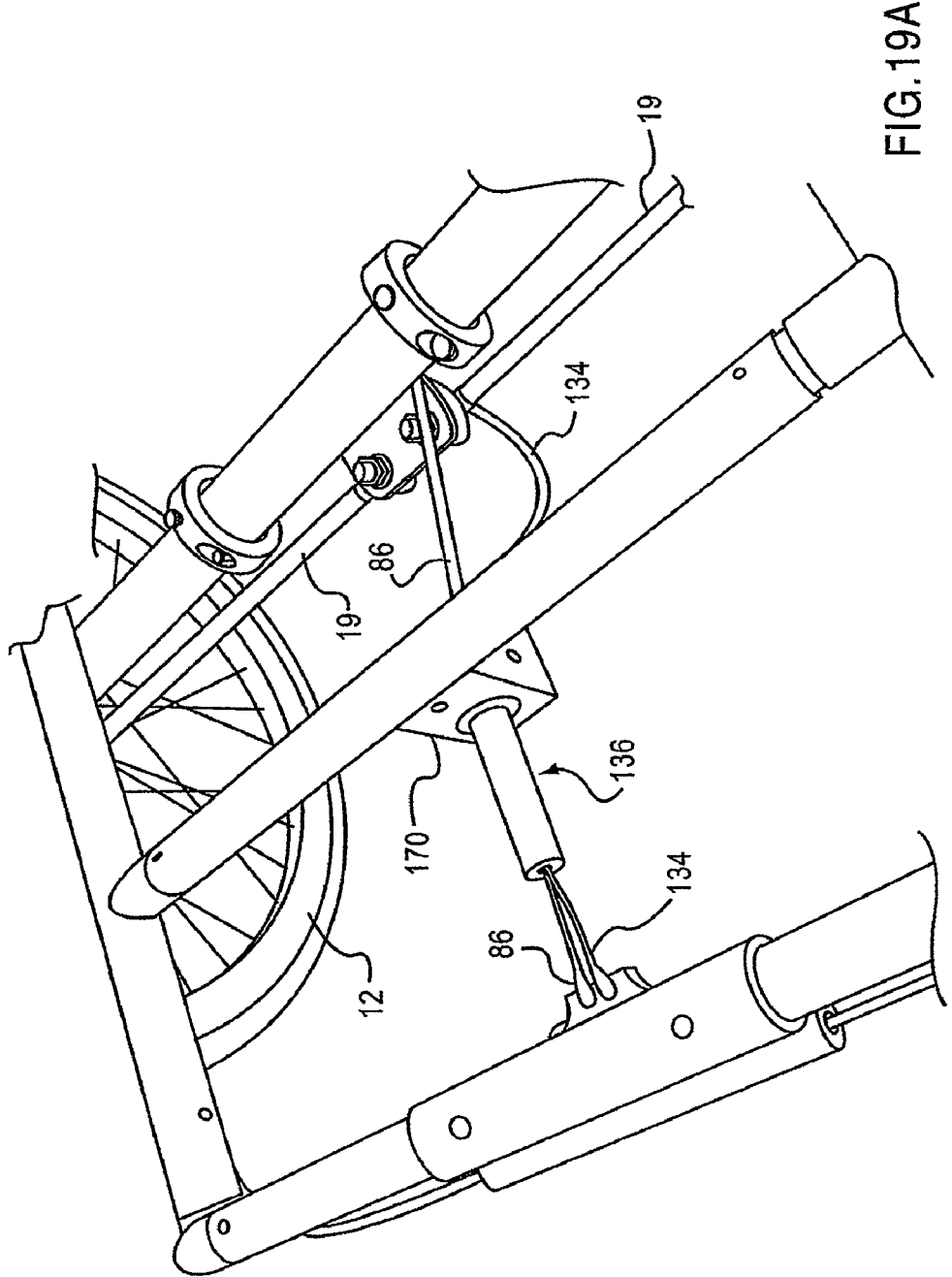
FIGS. 19A and 19B illustrate the cable splicing assembly in the pushing section.
Figure 19B:
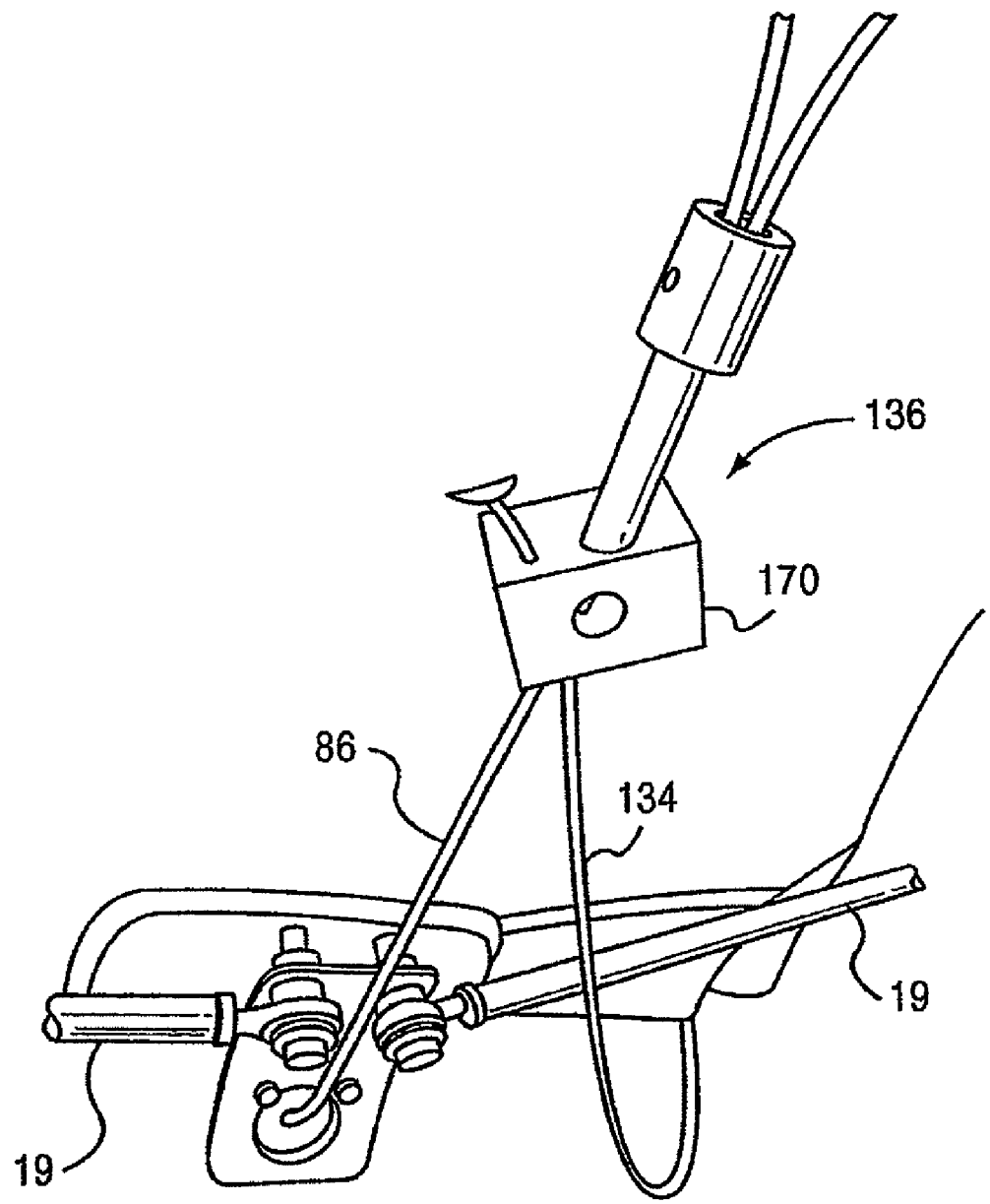
Figure 20:
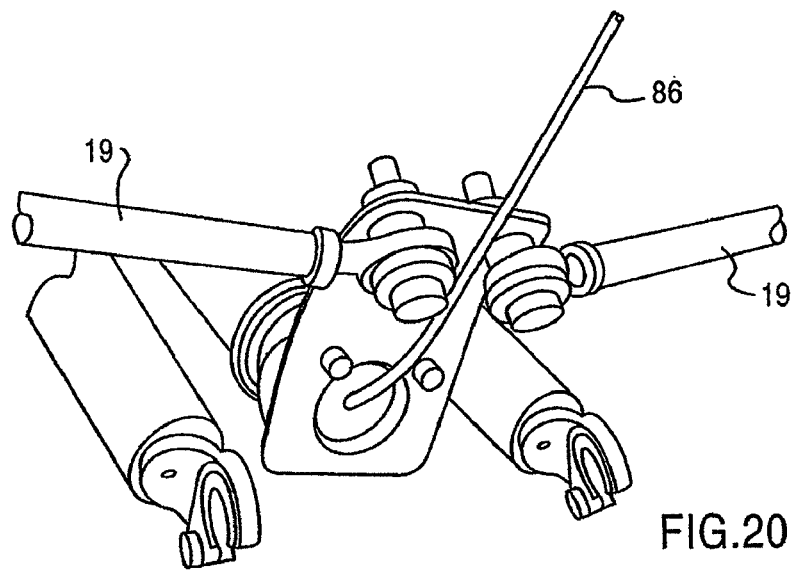
FIG. 20 illustrates cycle brake cables leading to the cable splicing assembly.
Figure 21:
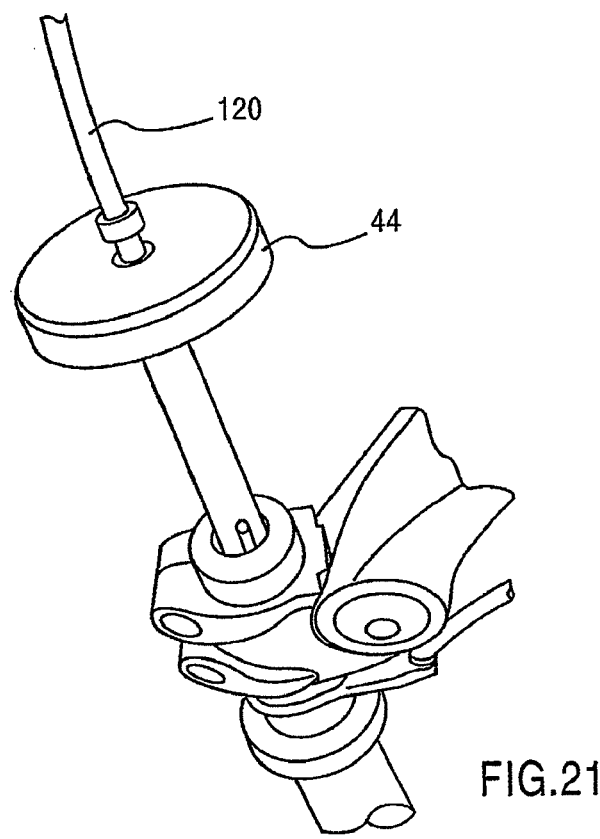
FIG. 21 illustrates the first front brake cable from the cycle handlebar to one of the front wheels.

As shown in FIGS. 17 to 21, the cable splicing assembly 136 guides therethrough a pair of control cables or brake cables. One of the brake cables is a parking brake cable 134 provided from the pushing section 4 of the vehicle to one of the left and right wheels of the pushing section, as shown in FIG. 17. The other brake cable is the second front brake cable 86 provided from the braking and steering assembly in the head tube 10 of the riding section to the other of the right and left wheels of the pushing section, as shown in FIG. 19A. The pair of brake cables 86, 134 from the pushing and riding sections can extend completely through the cable splicing assembly 136 to the wheels 12 of the pushing section. Alternatively, the brake cables can comprise two pairs of control or brake cables in which one brake cable from the pushing section and one brake cable from the riding section of the vehicle enter the cable splicing assembly 136 from opposite sides to terminate in the piston, and a pair of brake cables controlling the brakes at the left and right wheels of the pushing section begin in the opposite end of the piston and terminate at the left and right wheels.

The second front brake cable 86 from the riding section 6 and the parking brake cable 134 from the pushing section 4 enter into the cable splicing assembly 136 through a housing cap 138, as shown in FIGS. 18A, 18B, 19A and 19B. As described above, the front brake cable of the riding section 6 is the second front brake cable 86 that extends from the cable slide 76 of the lower connection post 34 to the splicing assembly 136. The housing cap 138 has a pair of apertures 140 in one end sized to securely fit therein cable housings encasing the pair of brake cables 86, 134. The cable housings encase the brake cables 86, 134 up to an inner surface 142 of the housing cap 138, at which point the brake cables 86, 134 extend through a longitudinally opposite single aperture 146 in the housing cap 138. The brake cables 86, 134 can be exposed and uncovered throughout the cable splicing assembly 136. The housing cap 138 includes a plurality of orthogonally arranged apertures 144 for receiving fixing members, such as, for example, threaded set screws 148 that hold the cable housings in place. Alternatively, the cable housings can encase the pair of brake cables along their entire length.

The brake cables 86, 134 then enter the piston 156, which is configured to slide axially within the splice housing between the opposite ends thereof up to the housing cap 138. The piston 156 has an opening 164 therethrough for guiding the pair of brake cables through a longitudinal length. The piston 156 slides in response to movement in the pair of brake cables 86, 134. For example, when the cycle operator squeezes the front brake lever 42 on the cycle handlebars 40 as shown in FIG. 14, the brake cables from the front brake (i.e., the first front brake cable 120 and the second front brake cable 86) are pulled in a direction toward the brake lever 42 which moves the brake cables, thereby allowing the piston 156 to slide in the cable splicing assembly 136. The piston 156 includes at least one aperture 166 in an outer peripheral surface for receiving fixing members, such as, for example, a threaded set screw 168 that clamps the pair of brake cables together.

The cables then enter the splice housing 148, which has opposite longitudinal ends. A first longitudinal end of the splice housing is proximal to the housing cap 138 and the second longitudinal end is distal from the housing cap 138. The first longitudinal end 150 of the splice housing has a circumferential opening 152 that is covered by the housing cap 138, which has a larger diameter than the first longitudinal end of the splice housing. The longitudinal end of the splice housing and the inner portion of the housing cap 138, form a cavity 154 therebetween which allows a piston 156 in the splicing assembly to move from one end of the assembly defined by the splice housing to the opposite end of the splice housing defined by the housing cap 138. The splice housing also has a pair of apertures 158 at the opposing second longitudinal end. The pair of apertures 158 allows the brake cables to exit the splicing assembly and connect to the brakes at each front wheel. The splice housing also includes a pair of apertures 160 in an outer peripheral surface for receiving fixing members, such as, for example, threaded set screws 162. Each fixing member 162 holds one of the brake cable housings in place.

The pair of brake cables 86, 134 performs a braking action on the front wheels 12 of the pushing section 4 of the vehicle. In the cable splicing assembly 136, one of the pair of brake cables is a second front brake cable 86 that extends from a front brake of the riding section 6 of the vehicle to one front wheel of the pushing section 4 of the vehicle and another of the pair of brake cables 134 is a parking brake cable that extends from a parking brake of the pushing section of the vehicle to another front wheel of the pushing section of the vehicle.

The splicing assembly can be mounted to the pushing section, such as on the frame of the pushing section, by fastening the housing cap thereto. The housing cap can be fastened by any means, including but not limited to, an adhesive, threaded screws and hook and loop fastener a bracket, such as 170 shown in FIG. 19A. The splice housing, piston and housing cap can be formed from materials such as metal and plastic.

In the present invention, the fixing members include, but are not limited to, pins, posts, screws or bolts or other fixing means. The fixing member 74 can be laterally inserted into the side of the cable slide, cable slide sleeve and elements disclosed above, by methods including, but not limited to, threading, press-fitting, and anchoring.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A braking and steering assembly in a vehicle having a pushing section and a riding section, the assembly comprising:
   a brake lever for controlling a first front brake cable;
   a rotatable front knob having a central aperture, the central aperture having an upper portion and a lower portion;
   an upper connection post having an upper end and a lower threaded end, the upper end fixedly engaging the lower portion of the central aperture of the rotatable front knob;
   a lower connection post aligned with the upper connection post, the lower connection post having a cable slide therein, the cable slide having a threaded aperture at an upper end;
   a cable rod having a first end slidably disposed within the upper connection post and a second end threadedly connected to an inner surface of the cable slide in the lower connection post;
   a cable adjuster disposed within the central aperture of the rotatable front knob and connected to the upper portion of the central aperture;
   a biasing member arranged between the cable rod and the cable adjuster; and
   a cable stop disposed at an end of the cable rod for clamping a terminal end of the first front brake cable, wherein the first front brake cable extends from the brake lever through the cable adjuster, the biasing member and the cable rod and terminates at the cable stop, and wherein the lower connection post includes a second front brake cable that extends from a pair of front wheels of the vehicle and terminates in the cable slide.

2. The braking and steering assembly according to claim 1, wherein the rotatable front knob is fixedly connected to the lower connection post in the pushing section through the upper connection post in the riding section, and wherein braking and steering in the riding section controls the braking and steering in the pushing section.

3. The braking and steering assembly according to claim 1, wherein the biasing member comprises a coil spring that is compressed when the upper connection post and the lower connection post are connected.

4. The braking and steering assembly according to claim 1, further comprising a front knob retainer for retaining the knob assembly in a head tube of the riding section.

5. A braking and steering assembly in a vehicle having a pushing section and a riding section, the assembly comprising:
   an upper connection post containing braking and steering components for the riding section, the upper connection post having an upper end and a lower threaded end;
   a lower connection post containing braking and steering components for the pushing section, the lower connection post having an aperture for threadedly receiving the lower threaded end of the upper connection post; and
   a rotatable front knob fixed to the upper end of the upper connection post, wherein rotatably tightening the front knob connects the lower end of the upper connection post with the upper end of the lower connection post and braking and steering in the riding section controls braking and steering in the pushing section.

\* \* \* \* \*